United States Patent [19]

Taylor

[11] 3,863,217

[45] Jan. 28, 1975

[54] APPARATUS FOR ASSEMBLING AND DISASSEMBLING DATA CHARACTERS TRANSFERRED BETWEEN DATA HANDLING DEVICES

[75] Inventor: Donald R. Taylor, Framingham, Mass.

[73] Assignee: Honeywell Information Systems Inc., Waltham, Mass.

[22] Filed: Dec. 13, 1973

[21] Appl. No.: 424,528

[52] U.S. Cl. .................. 340/146.1 C, 235/153 AC, 235/153 AK, 340/146.1 AG

[51] Int. Cl. ...................... G05b 23/02, H03k 13/34

[58] Field of Search .......... 340/146.1 AG, 146.1 C; 235/153 AC, 153 AK

[56] References Cited

OTHER PUBLICATIONS

Macak, R. W. et al. Parity Check Circuiter Unequal Byte Size Transfers in IBM Tech. Disc. Bull. 11(10): p. 1248, March 1969.

*Primary Examiner*—Felix D. Gruber
*Assistant Examiner*—R. Stephen Dildine, Jr.
*Attorney, Agent, or Firm*—Faith F. Driscoll; Ronald T. Reiling

[57] ABSTRACT

A magnetic tape peripheral controller includes a plurality of packing and unpacking storage registers with associated control apparatus. During a write operation, the control apparatus associated with the packing registers conditions these registers to assemble data characters received from an utilization device into one of a number of formats specified for writing as frames onto a magnetic tape medium. During the assembling operation, the control apparatus conditions circuits to generate parity check bits for the characters written on the medium. The check bits for the characters are transferred through the packing registers enabling the control apparatus to verify whether the assembling and transfer operations have proceeded properly. Similar control apparatus is utilized during a read operation in conjunction with the depacking registers. The control apparatus conditions these registers to disassemble the frames read from the magnetic tape medium into data characters conforming to one of a number of formats specified for transfer to the utilization device.

33 Claims, 22 Drawing Figures

Patented Jan. 28, 1975 3,863,217

20 Sheets-Sheet 2

Patented Jan. 28, 1975 3,863,217

20 Sheets-Sheet 10

Patented Jan. 28, 1975 3,863,217

20 Sheets-Sheet 12

Patented Jan. 28, 1975

3,863,217

20 Sheets-Sheet 15

APPARATUS FOR ASSEMBLING AND DISASSEMBLING DATA CHARACTERS TRANSFERRED BETWEEN DATA HANDLING DEVICES

BACKGROUND OF THE INVENTION

The present invention relates to circuits for assembling and disassembling data characters being transferred between a peripheral controller and a data processing unit.

PRIOR ART

It is well known to "pack" data characters to enable efficient use of storage and improve the rate of data transfer. It is also well known to provide "byte" converter circuits for modifying the serial-parallel arrangement of bits of data characters being transmitted between data handling devices. In this type of circuit, a parity check bit that is received with any input byte has no relationship to a parity check bit provided within the output byte. The reason is due to the redistribution of data bits between the input and output bytes of the byte converter. Accordingly, the input check bits normally are not carried through the byte converter but are dropped from the byte after they are used to make a check of the received input bytes.

Also, in prior art arrangements of the above type, the data characters being transferred are delayed in order to generate check bits for the resulting characters after they have been either assembled or disassembled into a specified format. For example, in one prior art arrangement, apparatus examines the bits of a first data character and generates a parity check bit for that character. Other apparatus sums the bits of a next character with the previously generated parity check bit in order to provide a check bit for the assembled character in the specified format. By requiring a stoppage in the transfer of data characters, this arrangement delays the starting of the storage operation such as tape writing operation. Because the arrangement requires parity check bits to be generated from different points within the system, it can also create errors.

Accordingly, it is a primary object of the present invention to provide improved apparatus for packing data characters transferred between a pair of data handling devices.

It is another object of the present invention to provide apparatus for verifying the correctness of a data transfer operation during which data bit characters are packed into a specified format.

It is a more specific object of the present invention to provide apparatus for use in a magnetic tape peripheral controller to convert data characters from a first format into a second format using a minimum of additional apparatus.

SUMMARY OF THE INVENTION

The above objects are achieved by the apparatus of the present invention which includes a plurality of registers and control apparatus. During an assembling or "packing" operation, the bits of characters received from a first storage device, such as the memory of a central processing unit, CPU, are shifted through first and second registers under the direction of the control apparatus. After a predetermined number of shifts, the characters will have been assembled into the required format for transfer to a storage device. In the preferred embodiment, the assembled characters are written onto a magnetic tape storage medium.

During the packing operation, checking circuits generate parity check bits and these check bits as well as the data bits are transferred through the remaining registers. Prior to writing the assembled characters, the check bits are examined to determine if the shifting and transfer operations had proceeded correctly. In the event of a parity error, an error indicator is set and the character with bad parity is written onto the medium. By writing bad parity, the system guarantees that when the character is read, it will be flagged as having an error.

The control apparatus in the handling of various formats is operative to modify the number of shifts so as to utilize the same apparatus for assembling the characters into the particular format specified.

During a disassembling or "depacking" operation, similar control apparatus shifts the characters read from the magnetic tape medium through a pair of registers a predetermined number of times until the characters are in the format required for transfer to the CPU. Additionally, the control apparatus also includes means for modifying the direction of shifting so as to provide the data characters in the required format when the characters from the magnetic tape medium are read in a reverse direction.

The novel features which are believed to be characteristic of the present invention, both as to its organization and method of operation, together with further objects and advantages thereof will be better understood from the following description when considered in connection with the accompanying drawings. It is to be expressly understood, however, that each of the drawings is for the purpose of illustration and description only and is not intended as a definition of the limits of the invention.

Figure 1:
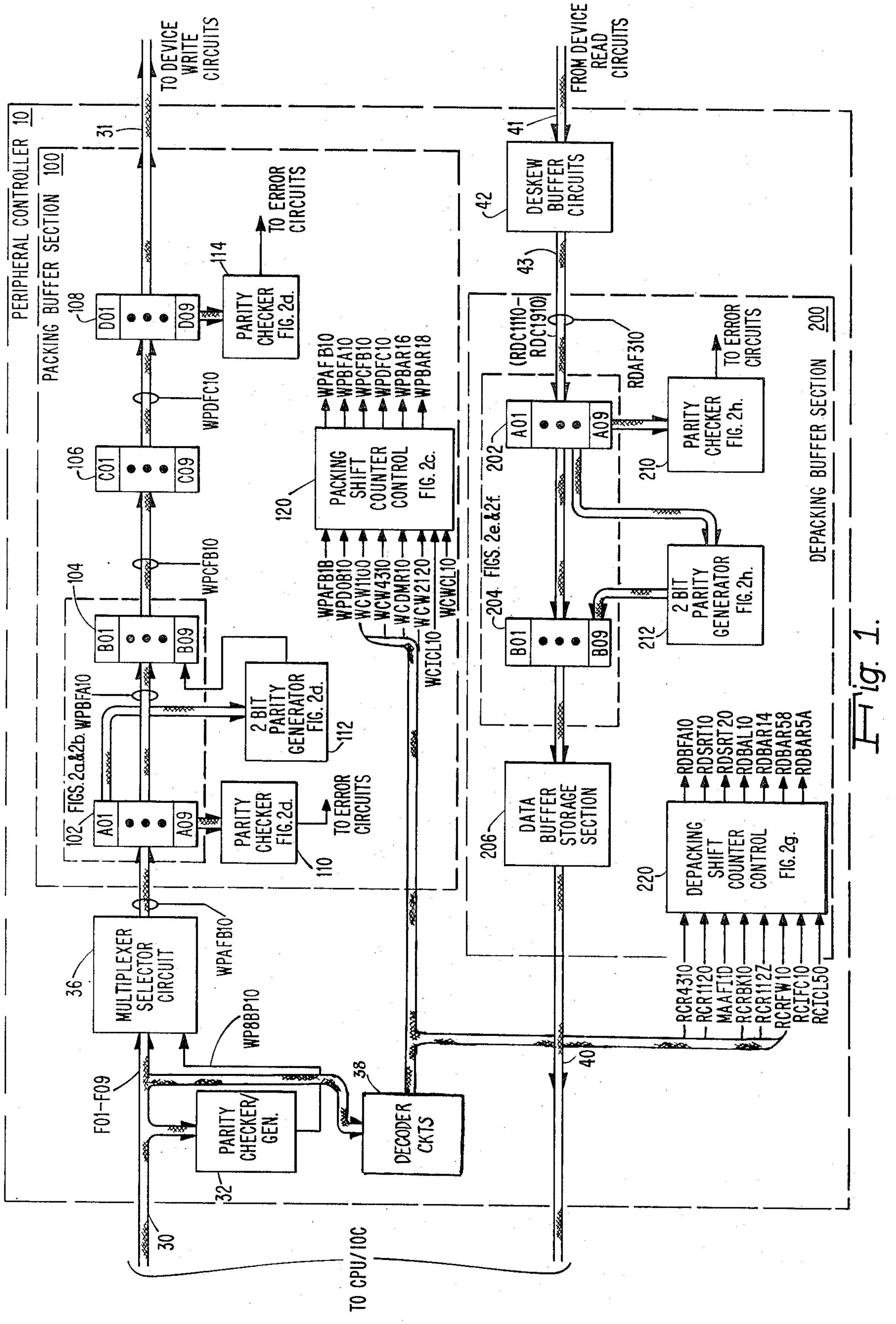
FIG. 1 is a block diagram of a magnetic tape peripheral controller which incorporates the principles of the present invention.

FIGS. *2a* and *2b* show in greater detail the packing registers of FIG. 1.

FIG. *2c* shows in greater detail the control section 120 of the FIG. 1.

FIG. *2d* shows the checking circuits of the packing section 100 of FIG. 1.

FIGS. *2e* and *2f* show in greater detail the registers of the depacking section 200 of FIG. 1.

FIG. *2g* shows in greater detail the control section 220 of FIG. 1.

FIG. *2h* shows in greater detail the checking circuits included within the depacking section 200 of FIG. 1.

FIG. *3a* illustrates the flow of data during the performance of a one by one packing operation in accordance with the present invention.

FIG. *3b* shows the data flow during the performance of a two by one packing operation in accordance with the present invention.

FIG. *3c* shows the data flow during the performance of a four by three packing operation in accordance with the present invention.

FIG. *4a* illustrates the data flow during the performance of a one by one reading depacking operation in the forward and reverse direction in accordance with the present invention.

Figure 4A:
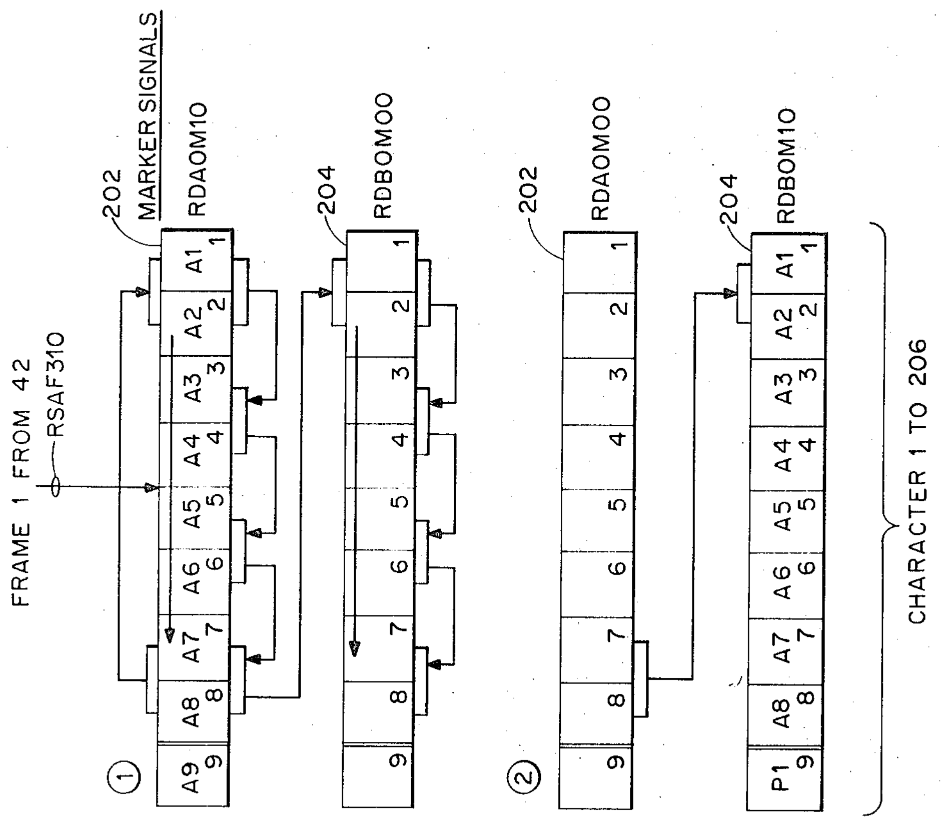
Figure 4B:
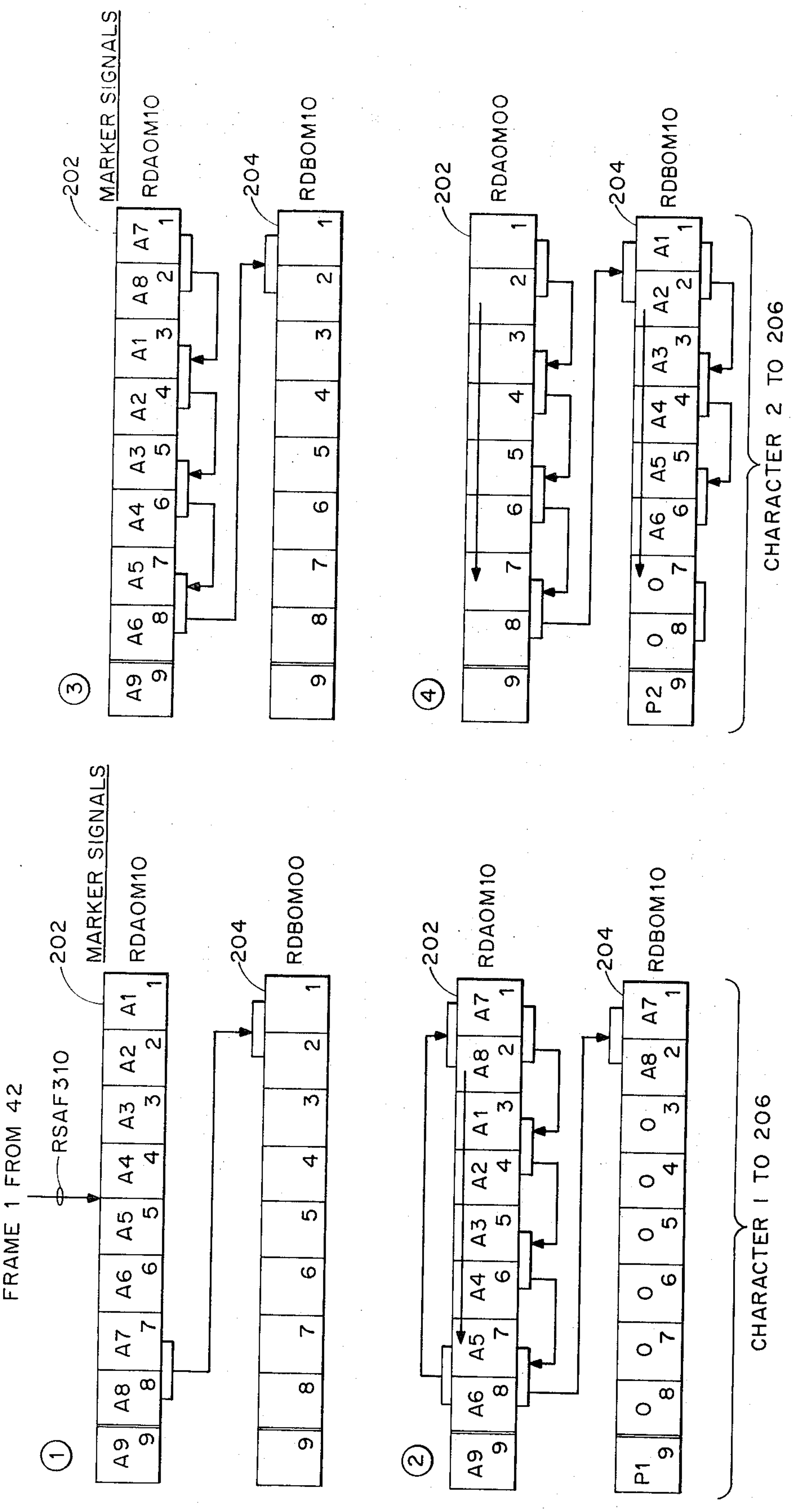

FIG. 4*b* illustrates the data flow during the performance of a two by one read forward depacking operation in accordance with the present invention.

Figure 4C:
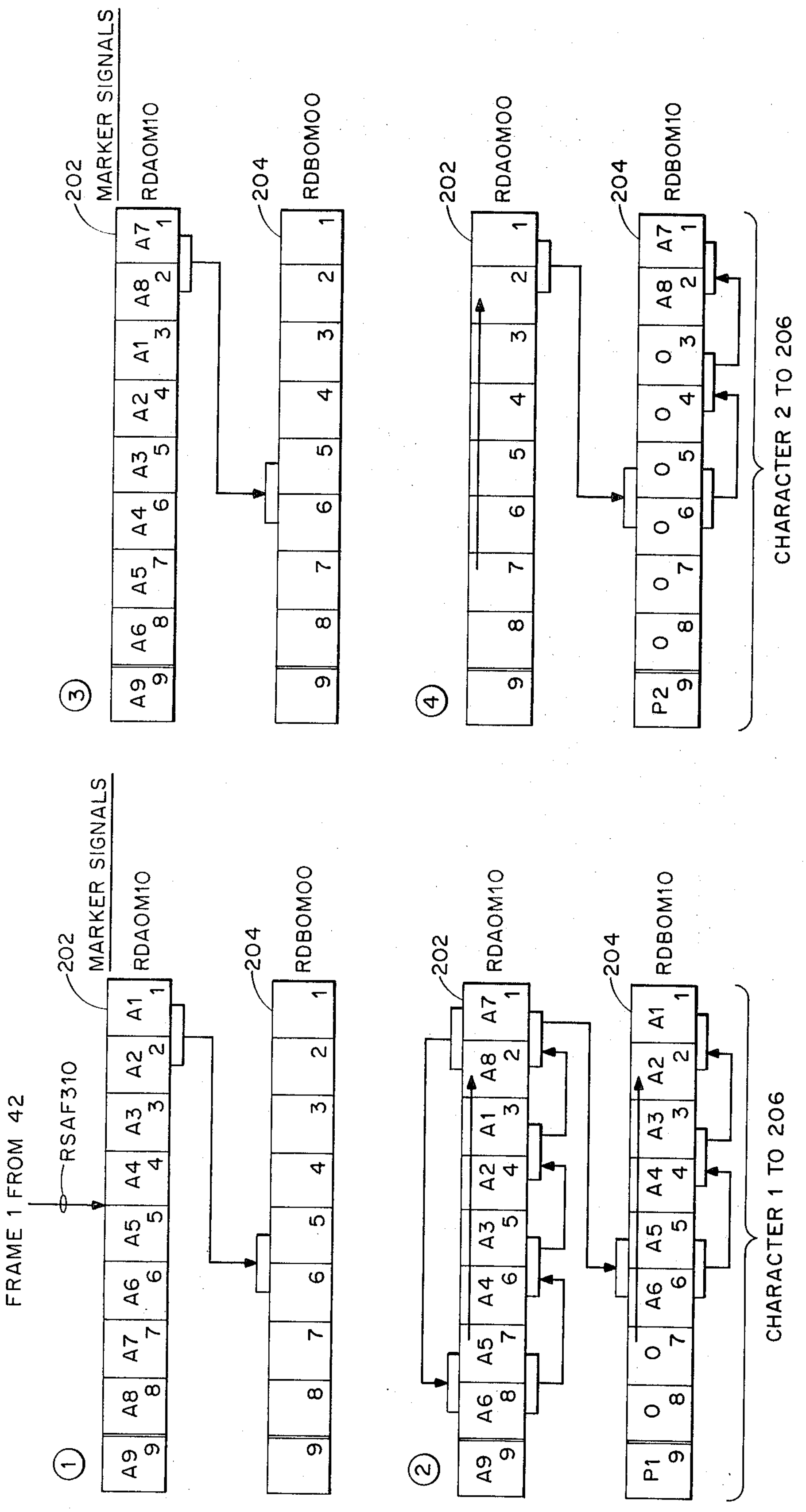

FIG. 4*c* shows the data flow during a two by one read backwards depacking operation performed in accordance with the present invention.

Figure 4D:
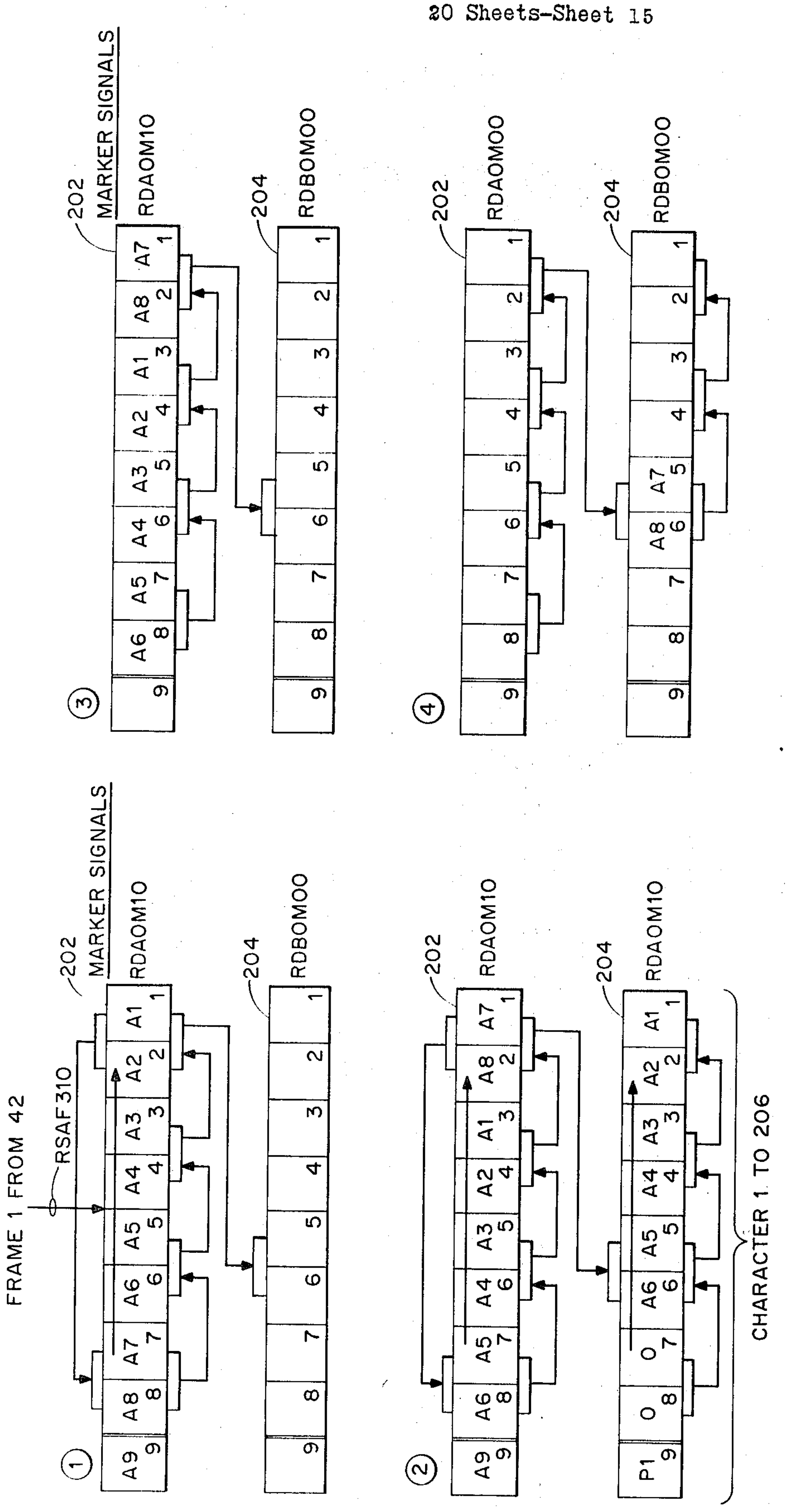
Figure 4E:
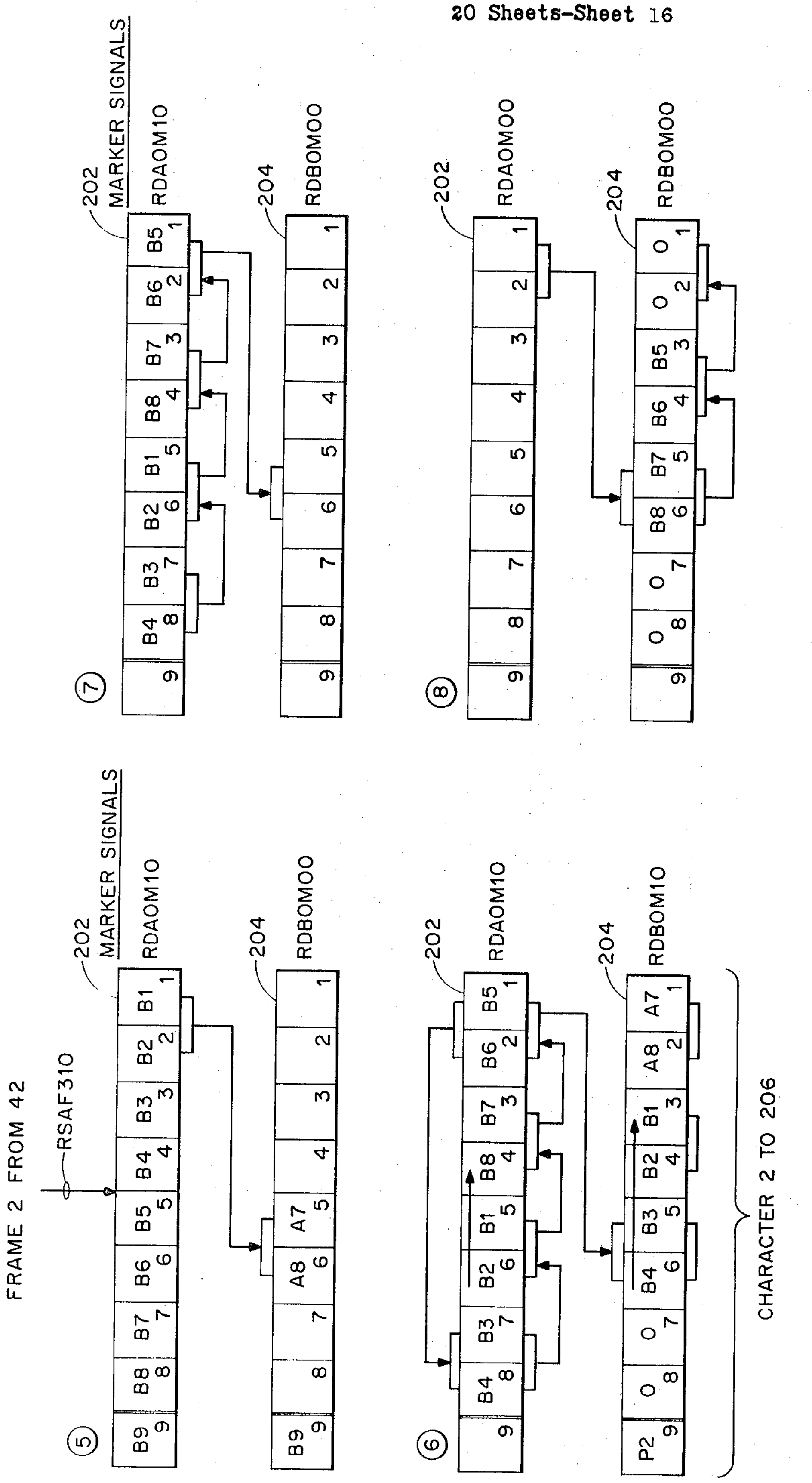
Figure 4F:
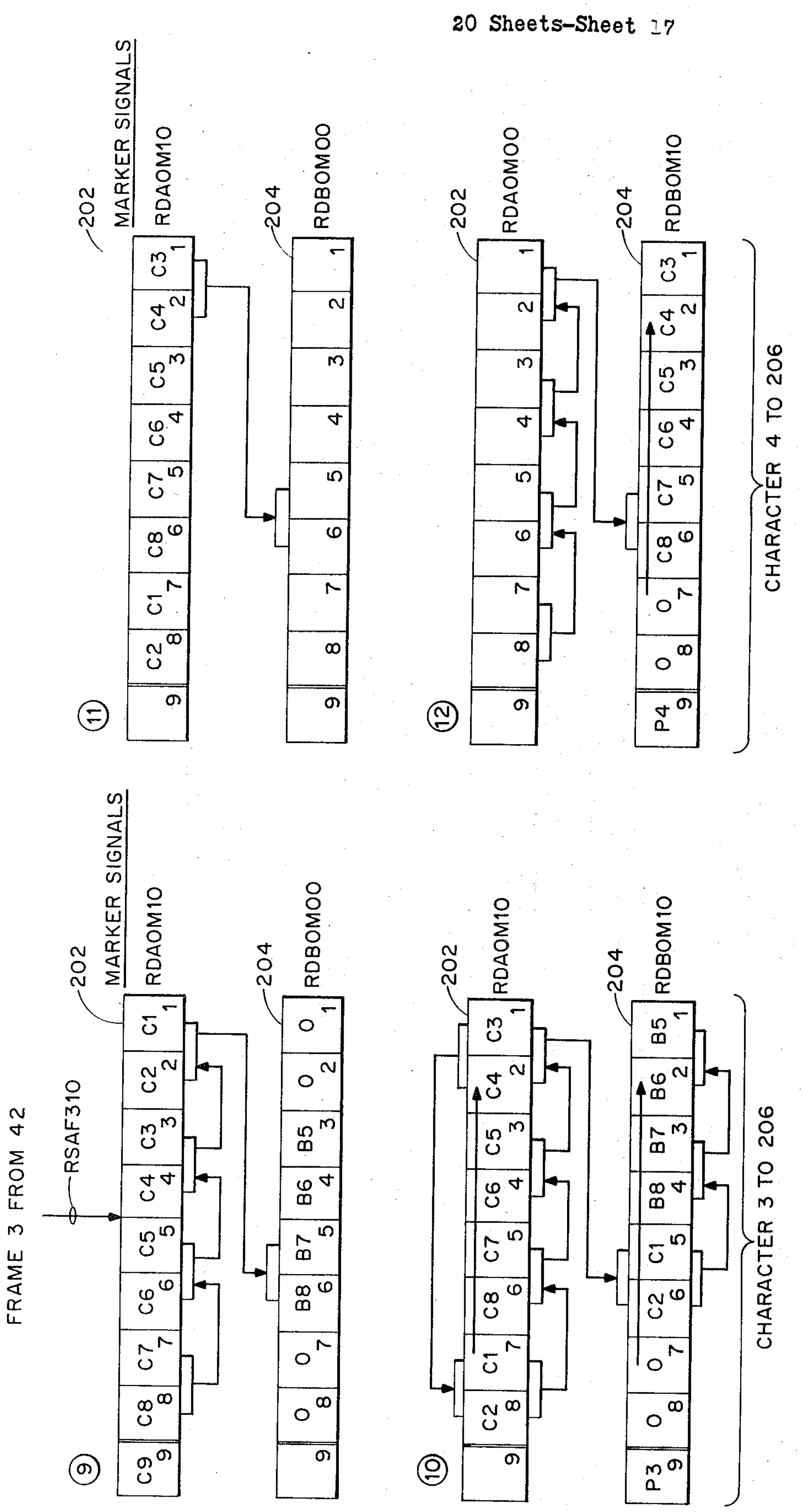

FIGS. 4*d* through 4*f* show the data flow during the performance of a four by three read forward depacking operation in accordance with the present invention.

Figure 4G:
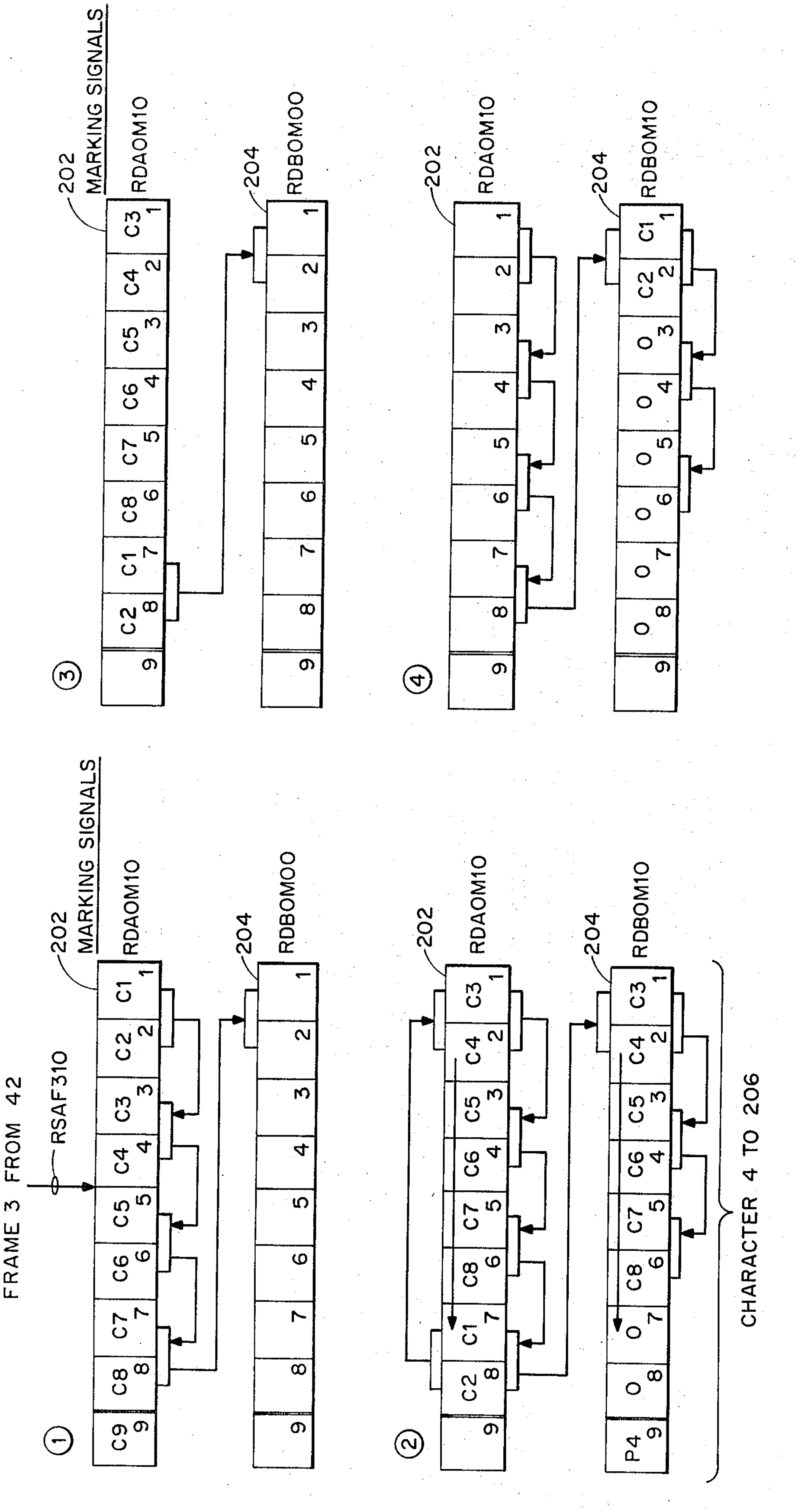
Figure 4H:
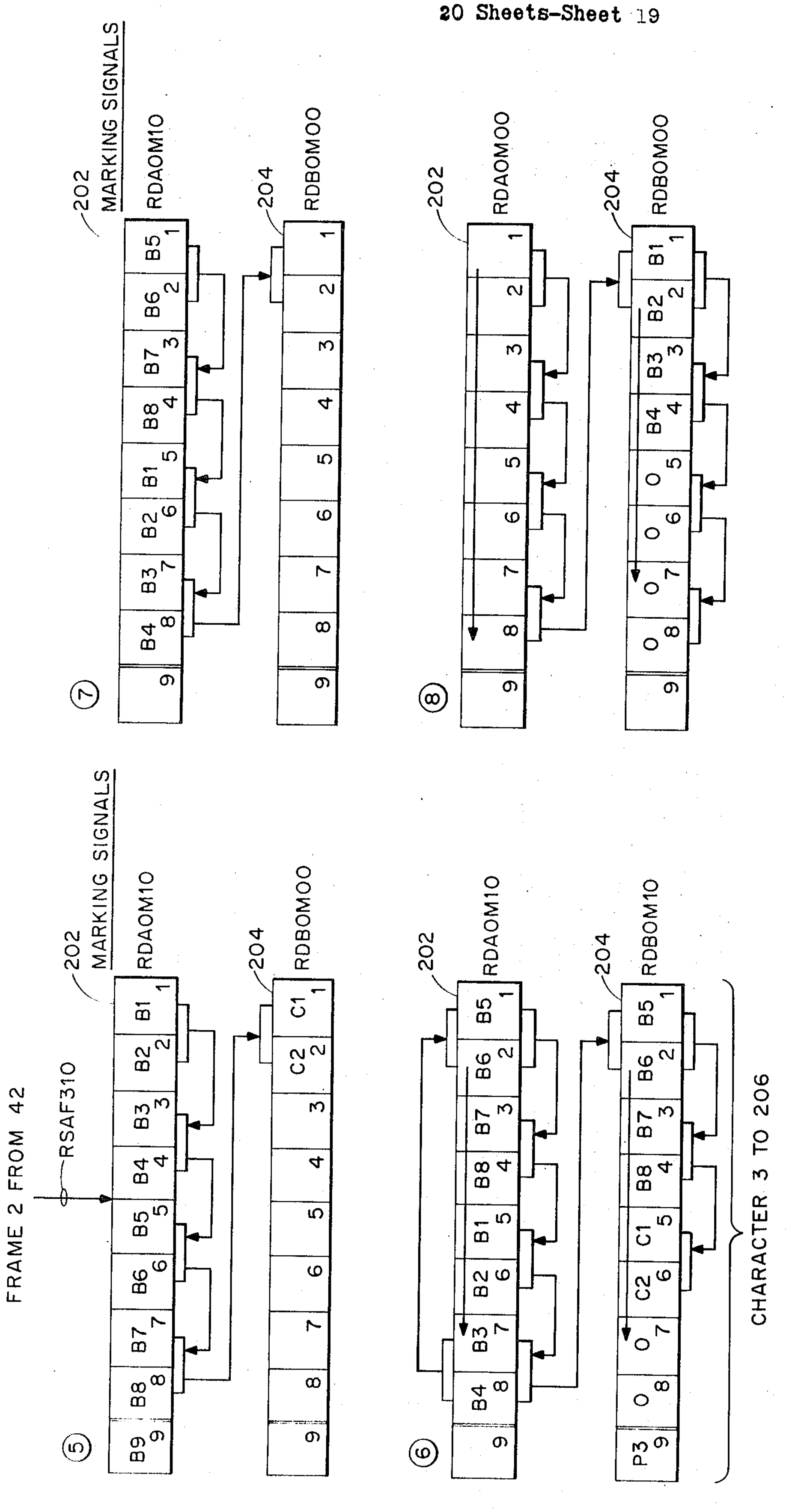
Figure 4I:
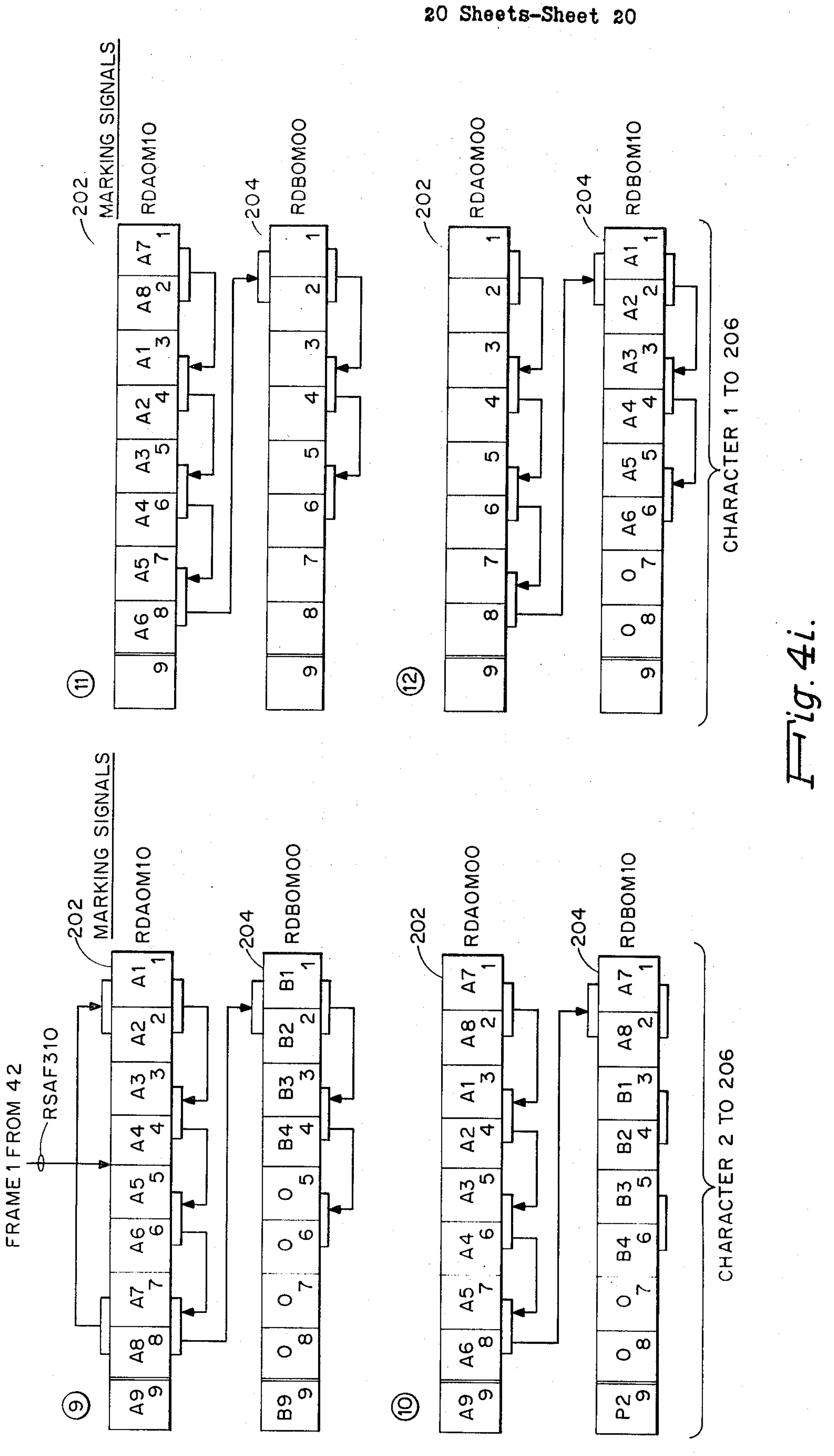

FIGS. 4*g* through 4*i* show the data flow which takes place during a four by three read backward depacking operation performed in accordance with the present invention.

DESCRIPTION OF THE PREFERRED EMBODIMENT

Referring first to FIG. 1, there is shown a magnetic tape peripheral controller 10 incorporating the apparatus of the present invention. As seen from FIG. 1, the controller 10 includes decoder circuits 38, a packing buffer section 100 and a depacking buffer section 200. The circuits 38, conventional in design, generate control signals in response to control characters applied via lines F01–F06 of an input bus 30 by an input/output data handling device (i.e., a central processing unit). The section 100 includes a plurality of registers 102, 104, 106 and 108 arranged as shown. The first register 102 receives data characters applied via a multiplexer selector circuit 36, conventional in design, which are stored in register 102 in response to a data transfer signal WPAFB10 as explained herein. The multiplexer selector circuit 36 is utilized so that characters from other sources, not shown, can also be loaded into register 102. These sources will normally include code translation circuits which translate the data characters into different character codes as required.

In the present system, the data source constitutes the main storage of a central processing unit (CPU). When operating in certain modes, the CPU supplies either a six or eight bit character with or without a parity check bit. In the instance where the CPU supplies the parity check bit, a parity checker/generator circuit 32 verifies the correctness of the character. Where the CPU just supplies the six bits of a character, the parity checker/generator circuit 32 generates an odd parity check bit signal WP8BP10 for the character and applies it as an input to the multiplexer selector circuit 36 as shown.

To verify that the bits of each data character have been correctly transferred and stored in register 102, a parity checker circuit 110 checks the character by generating an odd parity check bit for the eight bit character and compares its result against the parity check bit stored in bit position 9 of register 102. A parity generator circuit 112 which couples to register 102 generates an odd parity check bit during the time that the data characters are being "packed" or assembled into a specified one of a number of formats for recording on the magnetic tape medium. The resulting parity check bit is stored in bit position 9 of register 104. Thereafter, the entire nine bits of a character are transferred in parallel through registers 106 and 108 and applied to an output bus 31. A last parity checker circuit 114 which couples to register 108 checks the parity of the resulting "packed" character before it is written on magnetic tape medium. When checker circuit 114 detects an error, it applies an output signal to error storage circuits, not shown.

Circuits included in a packing shift counter control block 120 directs the various transfers and manipulation of data characters during the packing process. That is, these circuits generate the various transfer and control signals applied to the various portions of the packing buffer section 100 during the packing operation.

It is seen from FIG. 1 that a somewhat similar arrangement is used to disassemble or "depack" data characters applied from circuits included within a block 42. The characters are read from the magnetic medium and "deskewed" by the circuits of block 42. The section 200 includes a pair of registers 202 and 204, a control block 220, and a data buffer storage section 206 arranged as shown. A parity checker circuit 210 which couples to register 202 checks the parity of the character transferred from the deskew buffer circuits of block 42 into register 202. During the "depacking" operation, a further parity generator circuit 212 which also couples to register 202 generates a parity check bit for the character which is then written into the storage section 106. No further checking is made until the character is ready to be transferred to the CPU. Circuits included in depacking shift counter control block 220 generate the required transfer and control signals for the depacking operation. The storage section 206 includes buffer circuits either conventional in design or those disclosed in copending patent application titled "Apparatus for Detecting and Eliminating A Transfer of Noise Records to a Data Processing Apparatus" invented by Donald R. Taylor, bearing Ser. No. 424,527 and assigned to the same assignee As named herein.

DATA FORMATS

Before discussing in greater detail, the portions of sections 100 and 200, the various formats handled by the controller 10 will be discussed. The apparatus of the controller 10 can operate in any one of a number of packing modes for recording and reading data characters on and from a magnetic tape medium. These are: (1) one by one packing format — one eight bit CPU main storage data character per tape frame; (2) two by one packing format — two main memory characters per tape frame; and (3) four by three packing format — four main memory characters per three tape frames.

The particular type of packing format is specified by control information included with a control character of a read or write command specifying a data transfer operation. In the 1×1 format, the eight data bits, as for example six data bits and two punctuation bits, received from main storage are written as one frame on the magnetic medium. The frame read from the magnetic medium is transferred to the CPU as one data character.

In the 2×1 packing format, two characters from main storage are written as a single frame on the magnetic medium. Specifically, each data frame on tape comprises two data characters (i.e., bits 1 and 2 read out from a first storage location and bits 1 through 6 read out from a second storage location). Accordingly, during the reading of frames from tape, section 100 depacks each frame into two characters. The controller 10 transfers bits 1 and 2 as a first character and bits 1 through 6 as a second character into successive storage locations. Of course, bits 3 through 6 of the first character are filled with zeros. When the frames are being read in the reverse direction, a similar conversion takes place. However, the full character is transferred as a first character while the "zero filled" character is transferred as a second character.

In a 4×3 packing format, four six bit main memory characters are written as three sequential frames on the tape medium. During the depacking operation, three frames read from the medium are converted into four six bit main storage characters. When the frames are being read in an opposite direction, a similar conversion takes place. However, the four main storage characters are transferred to the CPU in the reverse order as compared to the transfer which takes place when the characters are being read from a tape moving in a forward direction.

DETAILED DESCRIPTION OF PREFERRED EMBODIMENT

Figure 2A:
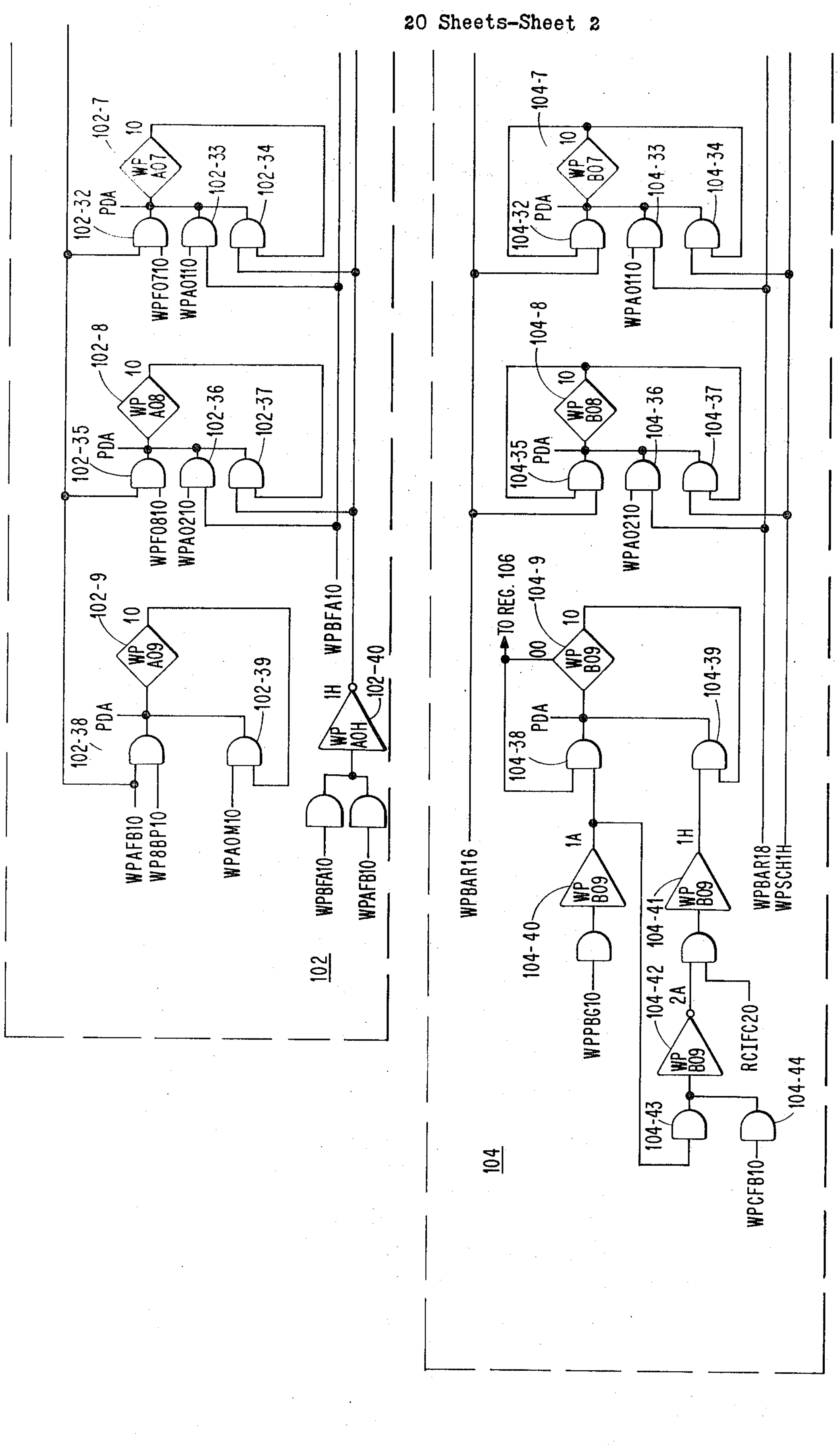

Packing Buffer Section 100 — FIG. 2*a*

Figure 2B:
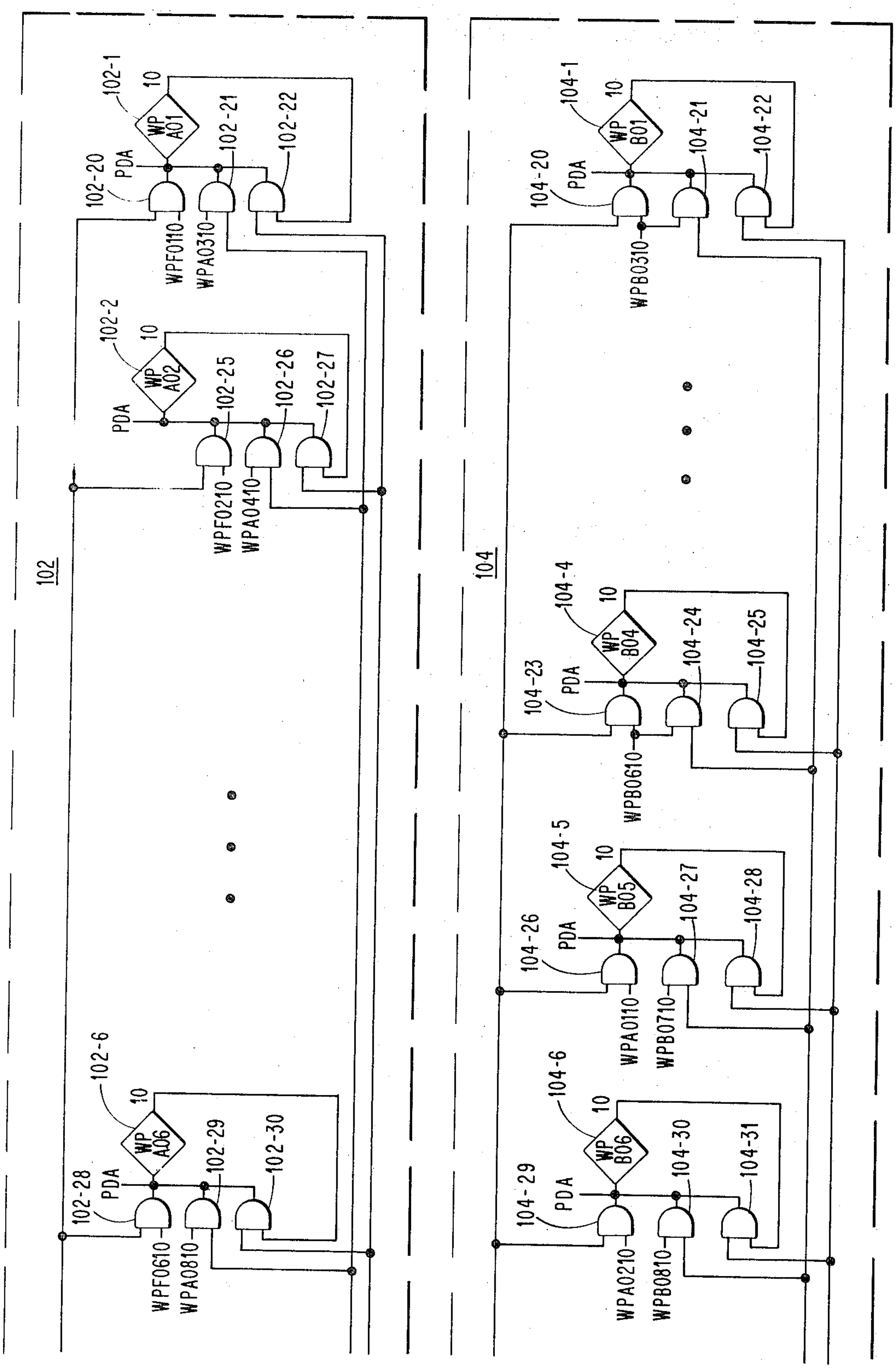

Referring first to FIGS. 2*a* and 2*b*, it is seen that the register 102 comprises nine synchronous flip-flops designated as 102-1 through 102-9, a gate and inverter circuit 102-40 and AND gate circuits 102-20 through 102-39 arranged as shown. The signals WPF0110 through WPF0810 from circuit 36 are applied to a first set of AND gate circuits and loaded into the flip-flops of register 102 in response to control signal WPAFB10. The flip-flop 102-9 in lieu of a bus signal, receives the output signal WP8BP10 from parity checker circuit 32 also via multiplexer circuit 36. The flip-flop 102-9 is reset via AND gate circuit 102-39 when a hold signal WPAOM10 is forced to a binary ZERO.

Additionally, each of the flip-flops 102-1 through 102-8 via a second set of AND gates are connected to receive another input signal from another one of the flip-flops of register 102. This establishes a path for a 2 bit right shift of the 8 bit contents of register 102 in response to a control signal WPBFA10. The gate and inverter circuit 102-40 enables the flip-flops 102-1 through 102-8 for loading and shifting operations by forcing a hold signal WPAOH1H to a binary ZERO. The circuit 102-40 in the absence of such operations maintains signal WPAOH1H at a binary ONE allowing the register 102 to store the bus signals.

The register 104 also comprises nine synchronous flip-flops designated as 104-1 through 104-9 in FIGS. 2*a* and 2*b*. The register 104 further includes AND gate circuits 104-20 through 104-39, arranged as shown. The flip-flop 104-9 further includes gate and amplifier circuits 104-40 and 104-41 in addition to gates 104-43 and 104-44 which couple to an inverter circuit 104-42 as shown.

Each of the flip-flops 104-1 through 104-8 can be conditioned to provide a 2 bit right shift of the 8 bit contents of register 104 in response to a control signal WPBAR18 (i.e., via AND gates 104-21, 104-24, 104-27, 104-30, 104-33, and 104-36). That is, flip-flops 104-1 through 104-4 receive signals WTBO3010 through WPB0610 respectively while flip-flops 104-5 through 104-8 receive signals WPBO710, WPB0810, WPA0110, and WPA0210 respectively. Additionally, each of the flip-flops 104-6 and 104-1 can be conditioned to provide a 2 bit right shift of 6 of the 8 bit contents of register 104 as received from register 102 in response to a control signal WPBAR16 (i.e., via AND gates 104-29, 104-26, 104-23, and 104-20). As seen from FIG. 2*a*, during loading, AND gates 104-32 and 104-35 retain the same contents for flip-flops 104-7 and 107-8. Each of the flip-flops 104-1 through 104-8 are reset via AND gates 104-22 through 104-37 in response to a control signal WPSCH1H.

The flip-flop 104-9 sums modulo two, the parity bits generated by parity generation circuit 112 for the bit contents of bit positions 1 and 2 of register 102. When all of the bits of a character have been shifted through the low order two bit positions of register 102, flip-flop 104-9 stores the parity bit for an entire character. Assuming odd parity is used, the binary ZERO output side of flip-flop 104-9 is used. In greater detail, the flip-flop 104-9 is arranged to complement as a function of the state of signal WPPBG10 from generator circuit 112. Complementing is achieved by applying signal WPPBG10 both as a set and reset signal to the flip-flop. In the first instance, it is applied by via gate and amplifier circuit 104-40 and AND gate 104-38. In the second instance, the signal is applied via gate circuit 104-43, inverter cirucit 104-42, AND gate and amplifier circuit 104-41, and AND gate 104-39. A control signal WPCFB10 is used to reset flip-flop 104-9 when the contents of register 104 are transferred to register 106. Additionally, flip-flop 104-9 is cleared to its binary ZERO state when a clear signal RCIFC20 is forced to a binary ZERO.

Figure 2C:
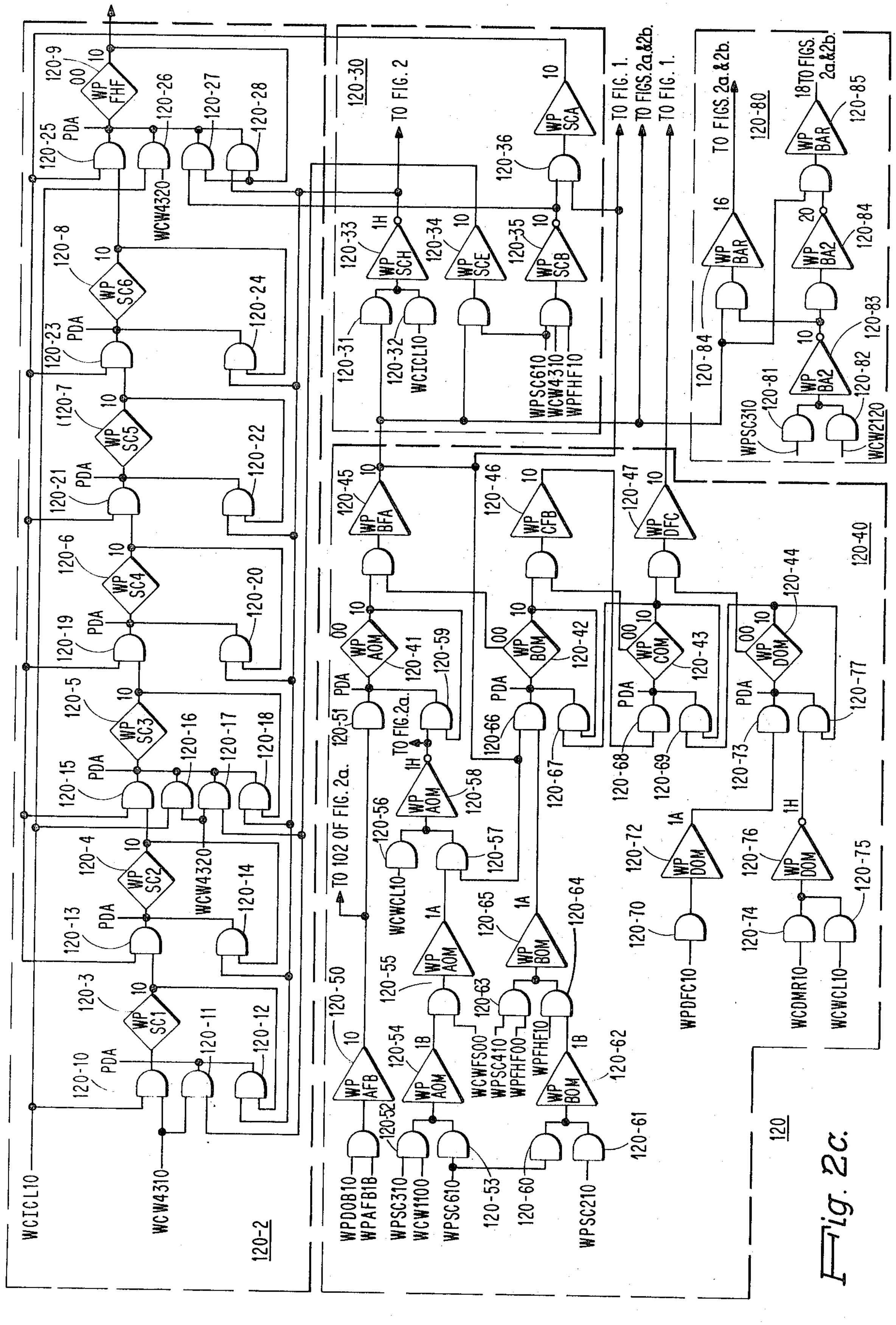

Packing Shift Counter Control Circuits — FIG. 2*c*

As mentioned, packing operations proceed under the direction of the circuits of packing control block 120. Referring to that Figure, it is seen that the circuits include a seven stage, synchronous counter 120-2 which is operative to generate the timing signals required for packing data characters into the various formats. The number of timing signals which comprise a complete operative cycle is determined by a plurality of mode control signals WCW4310, WCW1100, and WCW2120. In the case of the controller 10, these signals are derived from a control character included within a command issued to the controller 10. The controller normal or native mode of operation is transferring data characters in a 4×3 format wherein signal WPW4310 is a binary ONE. When this signal is a binary ZERO, it means that the controller 10 transferring data characters in either a 1×1 or 2×1 format.

The shift counter 120-2 includes flip-flops 120-3 through 120-9 and AND gate circuits 120-10 through 120-28 arranged as shown. The counter has twelve states, the first six and second six states respectively being specified by flip-flop 120-9 being a binary ZERO and binary ONE state. The stages of shift counter 120-2, initially, are reset to their binary ZERO states when a clear signal WCICL10 is forced to a binary ONE. Resetting takes place by via an inverter circuit 120-33 and AND gates 120-12, 120-14, 120-18, 120-20, 120-22, 120-24 and 120-28. Also, at this time, selected ones of the flip-flops, 120-3 through 120-8 are preset to their binary ONE states, defined by the mode signals and corresponding format of data characters. For example, in the case of a 4×3 format, flip-flop 120-3 is switched to its binary ONE state via AND gate 120-10. In the case of either 1×1 or 2×1 format, both flip-flops 120-5 and 120-9 are switched to their binary ONE state via AND gates 120-16 and 120-26 respectively.

The circuits of block 120-30 generate the signals for clearing and advancing the counter 120-2 through its various states. In particular, it is gates 120-31 and 32 together with the inverter circuit 120-33 which generate the hold signal WPSCH1H for resetting the stages of counter 120-2. In addition to this happening in response to clear signal WCICL10, the counter 120-2 is cleared when register 102 is full (i.e., signal WPAOM10 is a binary ONE) and register 104 is empty (i.e., signal WPBOMOO is a binary ONE). This causes an AND gate and amplifier circuit 120-45 to force signal WPBFA10 to a binary ONE. Also, signal WPBFA10 conditions an AND gate and amplifier circuit 120-34 to enable the advancing of counter 120-2 when signal WPSCB10 is a binary ONE by conditioning an AND gate and amplifier circuit 120-36 to force advance signal WPSCA10 to a binary ONE. When flip-flop 120-9 is set to ONE, the controller 10 is operating in a 4×3 mode (i.e., signal WCW4310 is a binary ONE) and the counter advances to a count of 6 (i.e., siganal WPSC610 is a binary ONE), this causes an AND gate and inverter circuit 120-35 to force signal WPSCB10 to a binary ZERO. At this time, AND gate and amplifier circuit 120-36 is conditioned to force signal WPSCA10 to a binary ZERO inhibiting the further advance of counter 120-2.

The circuits of block 120 further includes a plurality of register marker flip-flops 120-41 through 120-44, each of which when set to its binary ONE state indicates that the register associated therewith is filled. When the next succeeding register is empty, the marker flip-flop forces a corresponding one of the control signals WPBFA10, WPCFB10 and WPDFC10 to a binary ONE which in turn enables the data character to be transferred to a succeeding register either serially or in parallel as described herein. The marker signals are generated by AND gates 120-45 through 120-47.

The marker flip-flops 120-41 through 120-44 are set and reset to their binary ONE and ZERO states respectively by way of the AND gate and inverter circuits associated therewith. For example, flip-flop 120-41 is switched to its binary ONE state when the CPU places a character on the input bus 30. The character is in turn loaded into register 102 when an AND gate and amplifier circuit 120-50 forces signal WPAFB10 to a binary ONE. The signal WPAFB10, as seen from FIG. 2*a*, conditions the flip-flops 102-1 through 102-8 to store indications of the states of signals F0110 through F0810 applied to lines F01 through F08. The marker flip-flop 120-41 is reset to its binary ZERO state when clear signal WCWCL10 applied via gate 120-56 and inverter circuit 120-58 is forced to a binary ONE. Additionally, the flip-flop 120-41 resets to a binary ZERO when counter 120-2 advances to a count of three (i.e., signal WPSC310 is a binary ONE) and when the controller 10 is not operating in a 1×1 mode (i.e., signal WCW1100 is a binary ONE). This causes an AND gate 120-52 to condition amplifier circuit 120-54 to force hold signal WPA0M1H to a binary ZERO via AND gate and amplifier circuit 120-55 and AND gate 120-57. Also, by the same path, an AND gate 120-53 resets flip-flop 120-41 to a binary ZERO when the shift counter 120-2 has advanced to a count of six (i.e., signal WPSC610 is a binary ONE) by forcing signal WPA0M1B to binary ONE.

When the shift counter 120-2 advances to a count of four (i.e., signal WPSC410 is a binary ONE) and flip-flop 120-9 is in its binary ZERO state, marker flip-flop 120-42 switches to a binary ONE state via AND gate 120-63, amplifier circuit 120-65 and AND gate 120-66. Additionally, flip-flop 120-42 switches to a binary ONE when shift counter 120-2 advances to either a count of 2 (i.e., signal WPSC210 is a binary ONE) or to a count of 6 (i.e., signal WPSC610 is a binary ONE) and flip-flop 120-9 is in its binary ONE state. Either gate 120-60 or gate 120-61 and amplifier circuit 120-62, AND gate 120-64, amplifier circuit 120-65 and AND gate 120-66 are operative to produce the switching. AND gate 120-67 resets marker flip-flop 120-42 to a binary ZERO when the contents of register 104 have been transferred to register 106 (i.e., when flip-flop 120-43 is binary ONE).

The marker flip-flop 120-43 switches to a binary ONE when AND gate and amplifier circuit 120-46 forces signal WPCFB10 to a binary ONE signalling that register 104 is full (i.e., signal WPBOM10 is a binary ONE) and that register 106 is empty (i.e., signal WPCOM00 is a binary ONE). AND gate 120-69 resets flip-flop 120-43 when the contents of register 106 have been loaded into the next register 108 (i.e., marker flip-flop 120-44 is in its binary ONE state). At that time, AND gate and amplifier circuit 120-47 forces signal WPDFC10 to a binary ONE switching marker flip-flop 120-44 to a binary ONE state. Switching takes place via gate 120-70, amplifier circuit 120-72 and gate 120-73. When the data character stored in register 108 and applied to bus 31 of FIG. 1 has been written on the magnetic medium, signal WCDMR10 is forced to a binary ONE. This causes marker flip-flop 102-44 to be switched to its binary ZERO state via gate 120-74, inverter circuit 120-76 and AND gate 120-77. Also, when clear signal WPWCL10 is forced to a binary ONE, this resets flip-flop 120-44 by forcing signal WPDOM1H to a binary ZERO via gate 120-75 as shown.

The circuits 120-80 generate control signals WPBAR16 and WPBAR18 which are operative to cause the contents of bit positions 1 through 6 of register 104 to be shifted right by two positions and the contents of bit positions 1 through 8 of register 104 to be shifted right by two positions, respectively. When the controller 10 is operating in a 2×1 format, signal WPBAR16 switches to a binary ONE when transfer signal WPBFA10 is forced to a binary ONE. The signal WPBAR16 is generated by gates 120-81 and 120-82, inverter circuit 128-83 and AND gate and amplifier circuit 120-84. When the controller 10 is operating in other than a 2×1 format, signal WPBAR18 is forced to a binary ONE when signal WPBFA10 switches to a binary ONE. In addition to the other circuits mentioned, gate and inverter circuit 128-84 and AND gate and amplifier circuit 120-85 generate signal WPBAR18.

Figure 2D:
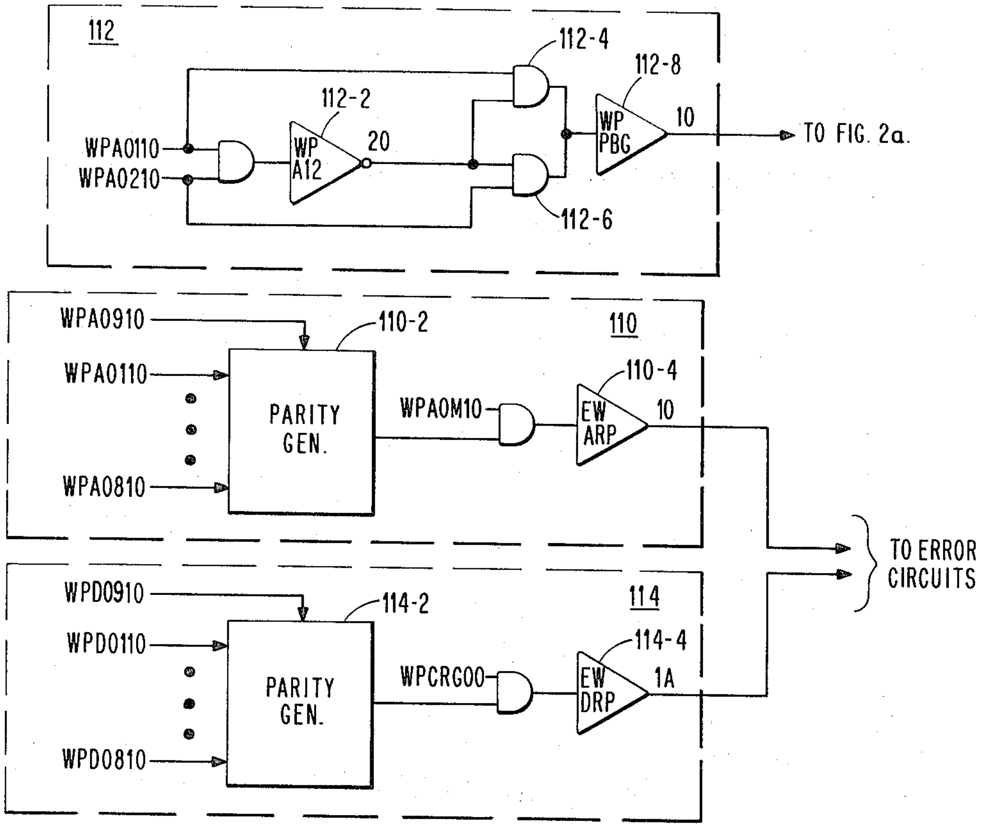

Packing Buffer Section Parity Circuits — FIG. 2*d*

The parity generation and checking circuits for section 100 are shown in detail in FIG. 2*d*. Referring to that Figure, it is seen that parity checker 110 comprises a parity generation circuit 110-2, conventional in design, operative to generate an odd parity check bit for the eight bit contents of register 102 and compare it with the parity bit stored in bit position 9 of register 102. In the event of an error condition, an AND gate and amplifier circuit 110-4 is conditioned by signal WPA0M10 to force an error signal EWARP10 to a binary ONE. The circuits of block 114 which include parity generation circuit 114-2, also conventional in design, and AND gate and amplifier circuit 114-4 operate in a similar fashion to force an error signal EWDRP1A to a binary ONE upon detecting a parity error in the character stored in register 108. The circuits including AND gate and inverter circuit 112-2, AND gate 112-4, AND gate 112-6 and amplifier circuit 112-8 together generate a parity bit based on the contents of the two low order bit positions of register 120 (i.e., flip-flops 102-1 and 102-2 of FIG. 2*a*).

Depacking Buffer Section 200

Figure 2H:
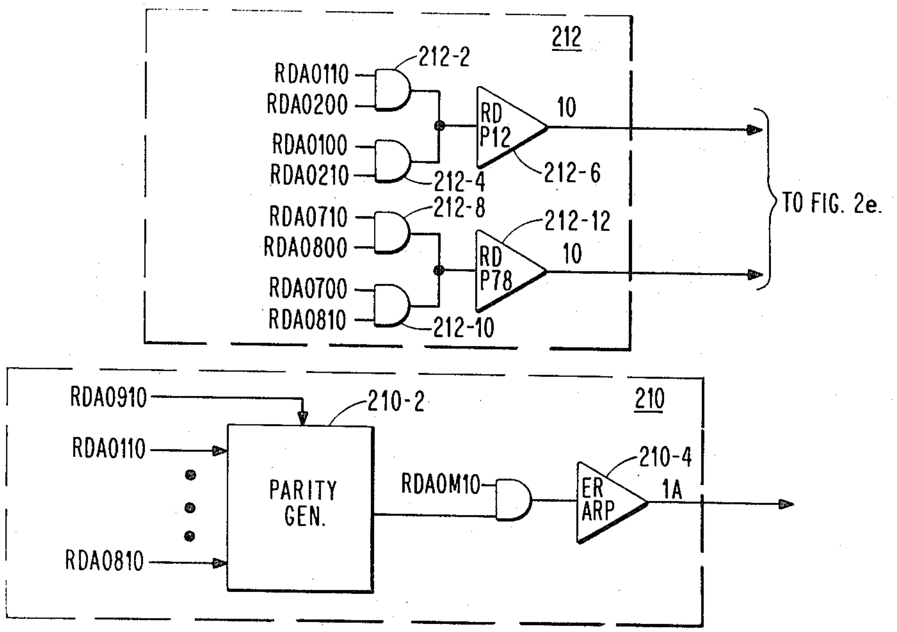
Figure 2E:
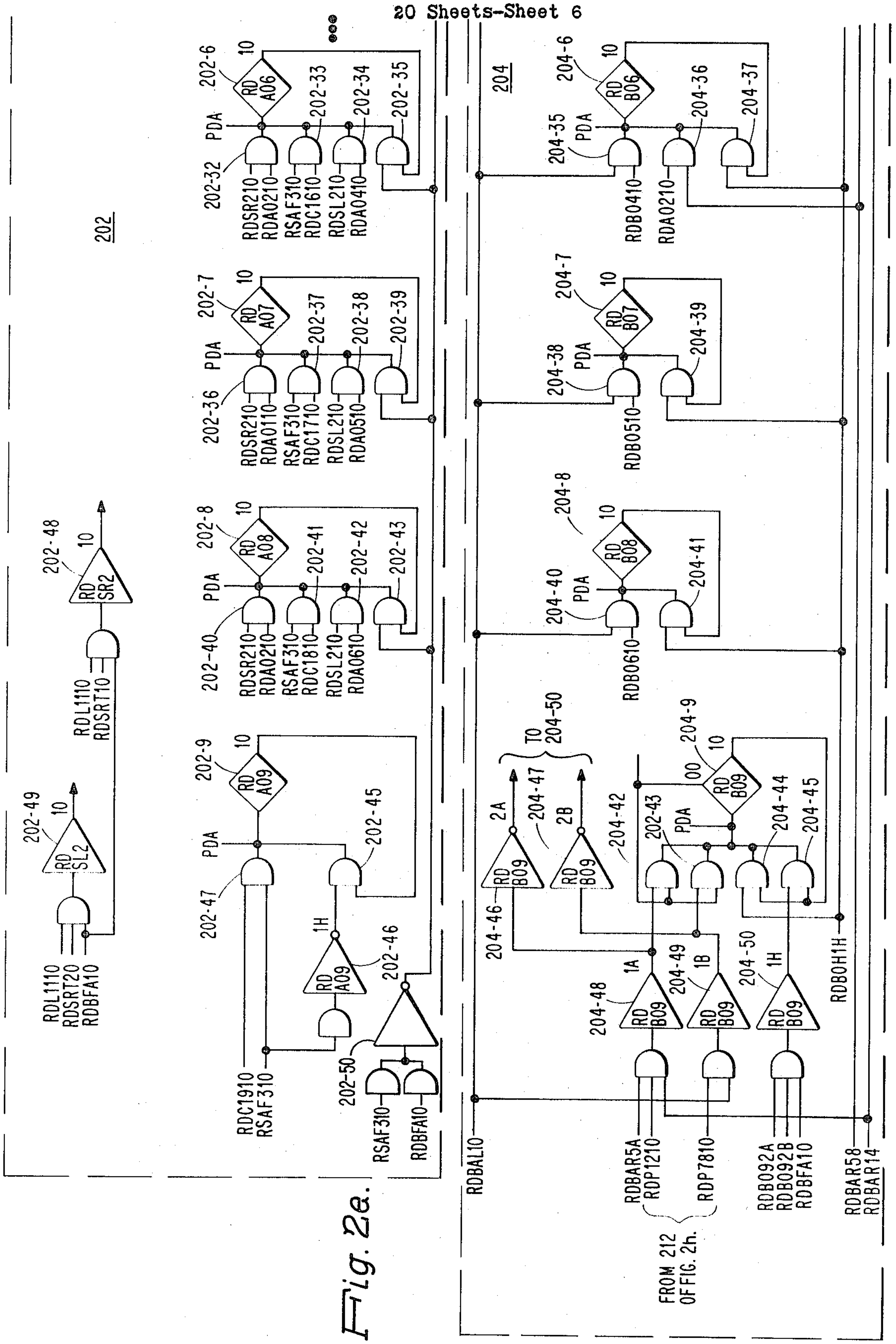
Figure 2F:
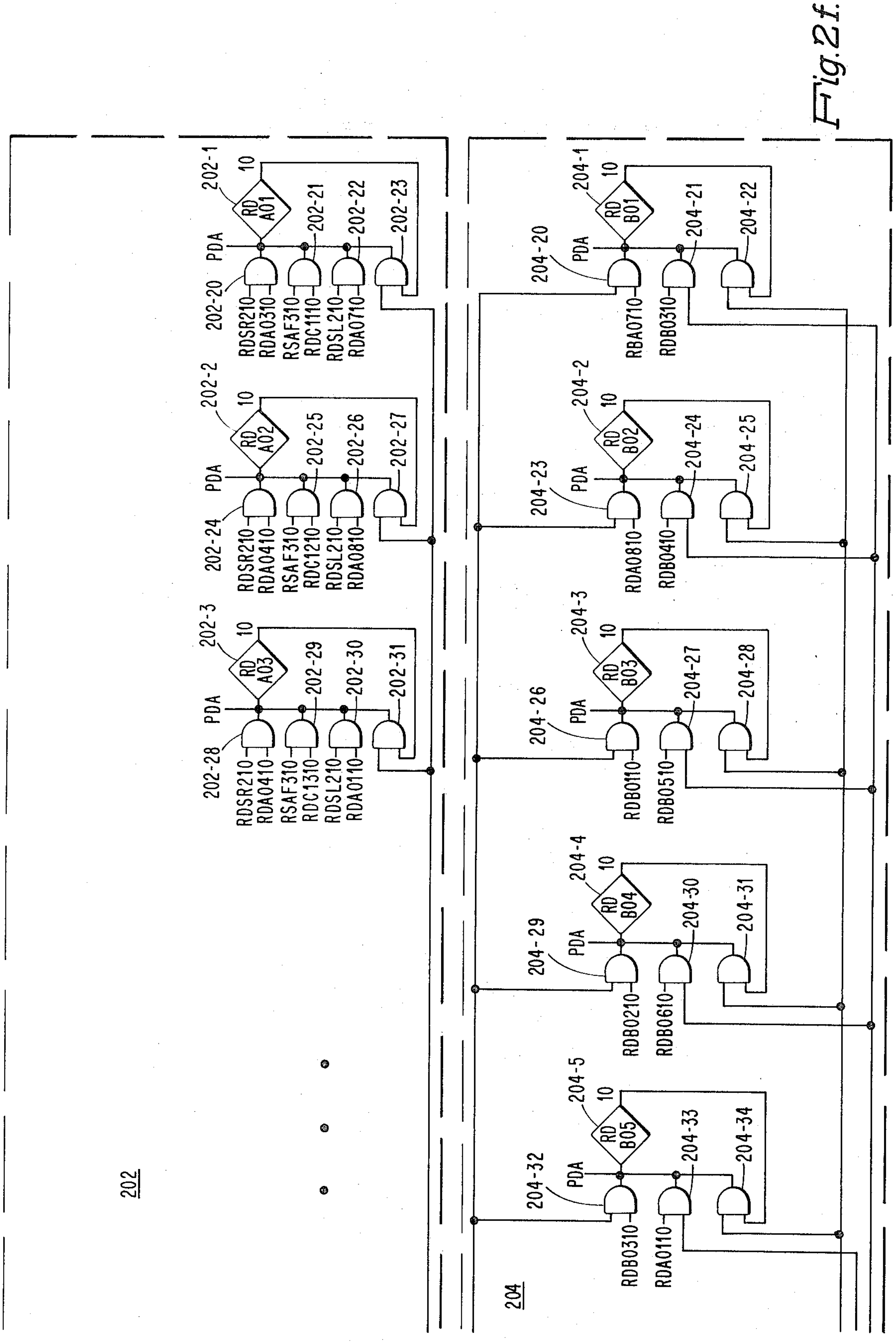

FIGS. 2*e* and 2*f* disclose in greater detail registers 202 and 204 of FIG. 1. As seen from this Figure, the registers are organized in a fashion similar to the section 100. Briefly, register 202 includes nine flip-flops designated 202-1 through 202-9. These flip-flops have a plurality of AND gates 202-20 through 202-47 arranged as shown. A first set of gates, each of which receives a control signal RDSR210, provides a two bit right shift of the contents of flip-flops 202-1 through 202-8 of register 202. A second set of gates, each of which receives a control signal RDSL210 provides a two bit left shift of the contents of register 202. The shift control signals RDSR210 and RDSL210 are generated by the AND gate and amplifier circuits 202-48 and 202-49 respectively.

A third set of gates receive signals RDC1110 through RDC1810 from the deskew buffer circuits 42 of FIG. 1 in response to a control signal RSAF310. For the purposes of the present invention, signal RSAF310 is forced to a binary ONE when all of the bits of a data character have been assembled in a last buffer register included within the deskew buffer circuits 42. At this time, signal RSAF310 applied to each of gates 202-47 through 202-21 loads the nine bits of the character into register 202. Signal RSAF310 applied to gate and inverter circuit 202-46 and to a gate and inverter circuit 202-50 when forced to a binary ZERO enables storage of the character in register 202. The flip-flops 202-1 through 202-8 are enabled for shifting when a control signal RDBFA10 is forced to a binary ONE.

The register 204 also includes nine flip-flops designated as 204-1 through 204-9. As shown, the flip-flops include a plurality of AND gates 204-20 through 204-45 arranged as shown. A first set of gates of flip-flops 204-1 through 204-8 which receive a control signal RDBAL10 provide a two bit left shift of the contents of bit positions 7 and 8 of register 202 (i.e., flip-flops 202-7 and 202-8) into register 204. A second set of gates of flip-flops 204-1 through 204-6 which receive control signals RDBAR14 and RDBAR58 provide a two bit right shift of the contents of bit positions 1 and 2 of register 202 (i.e., flip-flops 202-1 and 202-6) into register 204. All of the flip-flops 204-1 through 204-9 are reset to their binary ZERO states when a control signal RDBOH1H is forced to a binary ZERO.

The flip-flop 204-9 stores the sum of the parity check bit signals RDP1210 and RDP7810 generated by the circuits of FIG. 2*h* applied to AND gate and amplifier circuits 204-48 and 204-49 respectively. Depending upon the direction of shifting required to depack the data characters, the flip-flop 204-9 is conditioned to sum during shifting (i.e., when signal RDBFA10 is a binary ONE) either signal. That is, when signals RDBAR14 and RDBAR5A are binary ONES, signal RDP1210 is summed. Conversely, when signal RDBAL10 is a binary ONE, signal RDP7810 is summed. A pair of inverter circuits 204-46 and 204-47 invert the parity signals and apply them to an AND gate and amplifier circuit 204-50 as shown. This arrangement of input gates enables the flip-flop to complement in accordance with the input parity signals. When a depacked character resides in register 204, flip-flop 204-9 stores the parity bit for that character. Since odd parity is used, the binary ZERO side of flip-flop is forwarded to the storage section 206.

Figure 2G:
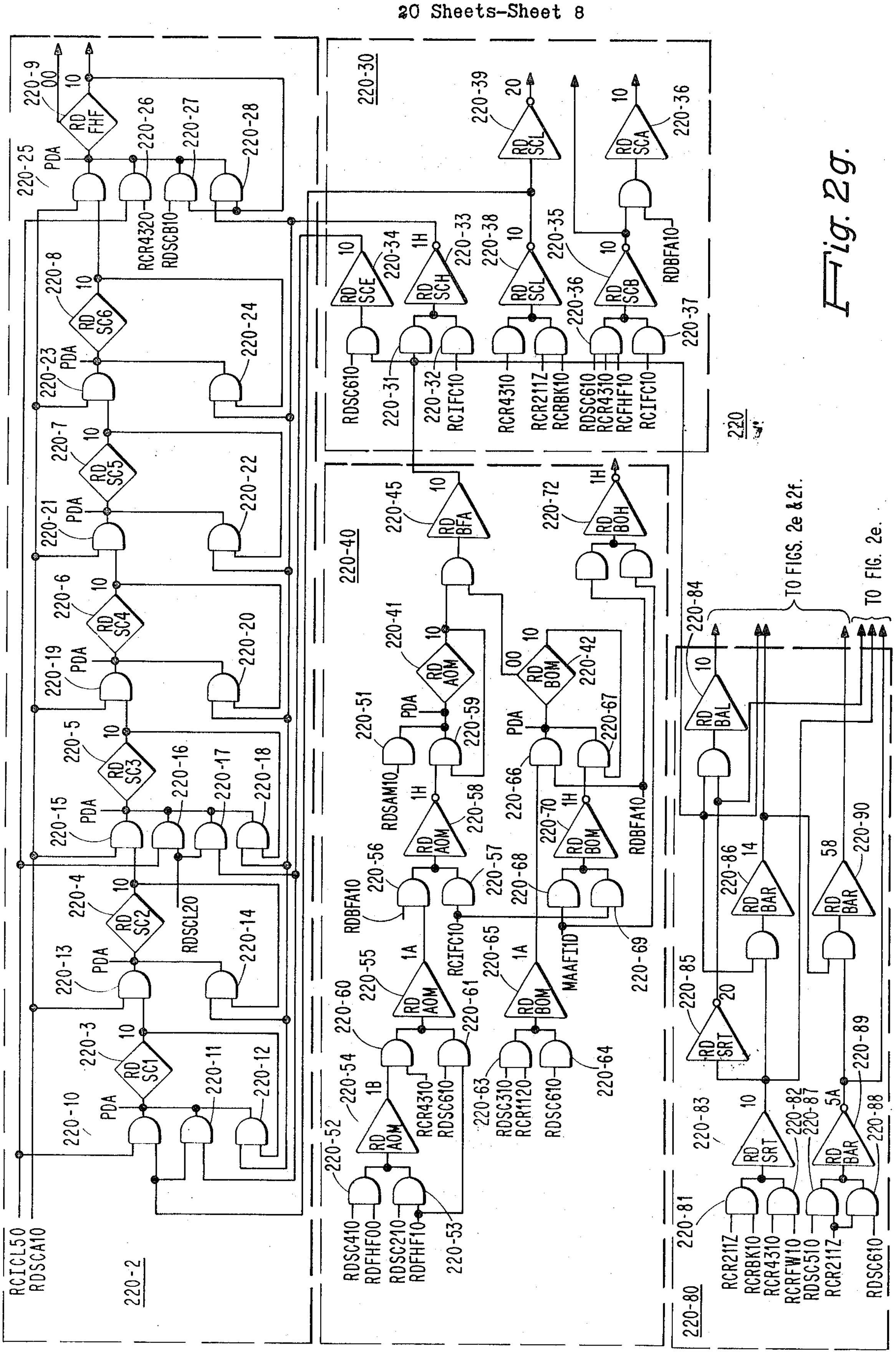

Depacking Shift Counter Control 220 — FIG. 2*g*

Similar to the control arrangement of Section 110, FIG. 2*g* shows the control 220 as including a shift counter 220-2, a plurality of marker flip-flops included within block 220-40, a plurality of control circuits included within block 220-30 and a plurality of transfer control circuits included within block 220-80. As shown, the counter 220-2 includes input AND gates designated 220-10 through 220-28. These gates condition the shift register counter 220-2 in a manner similar to that of counter of FIG. 2c, to provide signals for depacking data characters in the formats described above. Briefly, a first set of gates of flip-flops 220-3, 220-5 and 220-9 preset the corresponding flip-flops of the counter 220-2 to their binary ONE state in accordance with states of the mode control signals RCR4310 and RCR211Z when a control signal RCICL50 is forced to a binary ONE. That is, initially a clear signal RCIFC10 when forced to a binary ONE causes the circuits 220-30 to reset flip-flops 220-3 through 220-9 to binary ZEROS by forcing a hold signal RDSCHIH to a binary ZERO. When operating in a 4×3 format (i.e., signals RCR4310 and RCR4320 are a binary ONE and binary ZERO respectively), signals RDSCL10 and RCICL50 switch flip-flop 220-3 to a binary ONE. The same flip-flop 220-3 is also switched to a binary ONE when in a 2×1 format (i.e., signal RCR211Z is a binary ONE) and the data characters are being transferred in a reverse order (i.e., tape is being read backwards — signal RCRBK10 is a binary ONE). In all other instances, flip-flops 220-5 and 220-9 are switched to binary ONES by signals RDSCL20 and RDR4320.

A second pair of AND gates of flip-flops 220-4 through 220-9 advance the counter when the circuits 220-30 force a count advance signal RDSCA110 to a binary ONE. When the shift counter 220-2 advances to a count of six (i.e., signal RDSC610 is a binary ONE) a transfer signal RDBFA10 conditions the circuits 220-30 to shift end around by forcing an enabling signal RDSCE10 to a binary ONE. This causes AND gates 220-11 and 220-16 to again switch flip-flops 220-3 and 220-5 respectively to binary ONES in accordance with the states of signals RDSCL10 and RDSCL20.

When the circuits 220-30 force a control signal RDSCB10 to a binary ZERO, this inhibits further switching of flip-flop 220-9 and at the same time inhibits advancing of counter 220-2 by forcing advance signal RDSCA10 to a binary ZERO. When signal RDBFA10 is forced to a binary ONE, this resets the counter flip-flops to their binary ZERO states as previously described.

The marker section 220-40 includes two marker flip-flops 220-41 and 220-42 and the circuits 220-51 through 220-70, arranged as shown. The gate 220-51 switches marker flip-flop 220-41 to a binary ONE when signal RDSAM10 switches to a binary ONE. This signal is forced to a binary ONE when the register 202 receives a data character from the deskew buffers circuits 41. For the purpose of the present invention, it can be assumed that signal RDSAM10 is forced to a binary ONE when signal RSAF310 switches to a binary ONE.

The marker flip-flop 220-41 remains in its binary ONE state until the shift counter 220-2 advances to one of a number of predetermined counts required for the format of the data characters. The signals applied to AND gates 220-52 through 220-61 define the counts and formats. More specifically, in a 4x3 format (i.e., signal RCR4310 is a binary ONE) AND gate 220-60 resets flip-flop 220-41 to a binary ZERO by forcing a hold signal RDAOHIH to a binary ZERO at a count of 2 (i.e., signal RDSC210 is a binary ONE) and at a count of 4 (i.e., signal RDSC410 is a binary ONE) when flip-flop 220-9 is in its binary ONE and binary ZERO state respectively. When in other than a 4×3 format, AND gate 220-61 resets flip-flop 220-41 to a ZERO at a count of 6 (i.e., signal RDSC610 is a binary ONE) when flip-flop 220-9 is in a binary ONE state. Additionally, gate 220-57 resets flip-flop 220-41 to a binary ZERO when clear signal RCIFC10 is forced to a binary ONE which in turn forces signal RDAOM1H to a ZERO.

The AND gate 220-63 switches the marker flip-flop 220-42 for register 204 to a binary ONE when the counter 220-2 advances to a count of three (i.e., signal RDSC310 is a binary ONE) and the data characters are not in a 1×1 format (i.e., signal RCR1120 is a binary ONE). When the data character stored in register 204 has been written into the data buffer storage section 206 of FIG. 1, this forces a signal MAAFIID to a binary ONE. This causes gate 220-68 and inverter circuit 220-70 to force a hold signal RDBOMIH to a ZERO which resets marker flip-flop 220-42 to a binary ZERO. Resetting also occurs when RCIFC10 is forced to a binary ONE. It will be noted that signals MAAFI10 and RDBFA10 individually condition gate and inverter circuit 220-72 to force hold signal RDBOHIH to a binary ZERO resetting register 204 to all ZEROS.

The circuits 220-30 through 220-39 produce the aforementioned control signals for sequencing shift counter 220-2 through a cycle of operation. Specifically, gate and amplifier circuit 220-38 and inverter circuit 220-39 generate signals RDSCL10 and RDSCL20 respectively which preset the flip-flops of counter 220-2 as previously described. The AND gate 220-36 and gate 220-37 when switched to binary ONES, condition the inverter circuit 220-35 to force block signal RDSCB10 to a binary ZERO inhibiting the switching of flip-flop 220-9 and inhibiting counter advance in response to signal RDSCA10. The AND gate and amplifier circuit 220-34 generates signal RDSCE10 to be shifted end around beginning a new cycle of operation. The gate 220-31 and inverter circuit 220-33 reset the counter flip-flops by forcing signal RDSCHIH to a binary ZERO.

The circuits 220-81 through 220-90 generate the shift control signals in response to count signals from shift register 220-2, signals indicating the direction in which the magnetic medium is being read and signals indicating the format of the data characters being depacked. That is, when tape is being moved in a reverse direction (i.e, signal RCRBK10 is a binary ONE) and 2×1 format is specified (i.e., signal RCR211Z is a binary ONE), AND gate and amplifier circuit 220-81 forces signal RDSRT10 to a binary ONE. This conditions AND gate and amplifier circuit 220-86 to force signal RDBAR14 to a binary ONE when signal RDBFA10 is forced to a binary ONE. At the same time, inverter circuit 220-85 inhibits AND gate and amplifier circuit 220-84 from forcing signal RDBAL10 to a binary ONE. The AND gate 220-82 also forces signal RDSRT10 to a binary ONE when the data characters are read when the magnetic tape is moving in a forward direction (i.e., signal RCRFW10 is a binary ONE) and the data characters are in a 4×3 format (i.e., signal RCR4310 is a binary ONE).

Additionally, AND gate and amplifier circuit 220-9 forces signal RDBAR58 to a binary ONE when signal RDBAR5A is forced to a binary ONE by inverter circuit 220-89. Signal is normally a binary ONE except during certain portions of a 2×1 cycle of operation defined by the signals applied to AND gates 220-87 and 220-88. It is seen that AND gate and amplifier circuit 220-84 forces signal RDBAL10 to a binary ONE in other those conditions specified by signals applied to AND gates 220-81 and 220-82.

Parity Generation and Checking Circuits — FIG. *2h*

As seen from FIG. *2h*, the parity checker circuit 210 includes a parity generator circuit 210-2, conventional in design, which generates an odd parity bit for the eight bit contents of register 202 and compares it with the parity bit contents of register 202-9. When parity generator circuit 210-2 detects an error condition, the signal RDAOM10 causes gate and amplifier circuit 210-4 to force error signal ERARP1A to a binary ONE.

The parity generator circuits of block 212, as shown, include a first group of circuits for generating a parity bit by performing an exclusive OR operation upon the contents of the low order two bit positions of register 202. These circuits include AND gates 212-2 and 212-4 which couple to amplifier circuit 212-6. A second group of circuits including AND gates 212-8 and 212-10 and amplifier circuit 212-12, generate a parity bit by performing an exclusive OR operation upon the contents of bit positions 7 and 8 of register 202. The resulting signals RDP1210 and RDP7810 are applied to flip-flop 204-9 of FIG. *2e*.

Detailed Description of Operation

With reference to FIGS. 1, *2a* through *2h* and the diagrams of FIGS. *3a* through *3d* and *4a* through *4i* the operation of the present invention as utilized in controller 10 will now be described. FIG. *3a* illustrates the states of the registers 102 through 108 and associated marker flip-flops during different points of time in processing data characters transferred for storage in a 1×1 format. Initially, it is assumed that all registers and flip-flops have been cleared to binary ZEROS. During a write operation, data characters from main memory are to be written in their same format on the magnetic medium. This type of format will have been specified by one of control characters of a write command which when decoded forces signals WCW1100, WCW4320 and WCW2120 of FIG. *2c* to binary ONES. At this time, signal WCW4310 is a binary ZERO. This enables the packing shift counter control 120 to generate the required sequence of signals for transferring data characters through the registers in the manner illustrated by FIG. *3a*.

In greater detail, the bits of a first data character, designated A1 through A8, are stored in register 102 in response to transfer signal WPAFB10. As mentioned, this signal is generated when the data character is applied to the input bus 30 and then to register 102 via the multiplexer selection circuit 36. At this time, as seen from FIG. 2a, the odd parity bit, designated as A9, is also stored in register 102 in response to transfer signal WPAFB30. As mentioned, parity bit is either applied as an input from bus 30 or is generated by the parity checker/generator circuit 32.

Figure 3A:
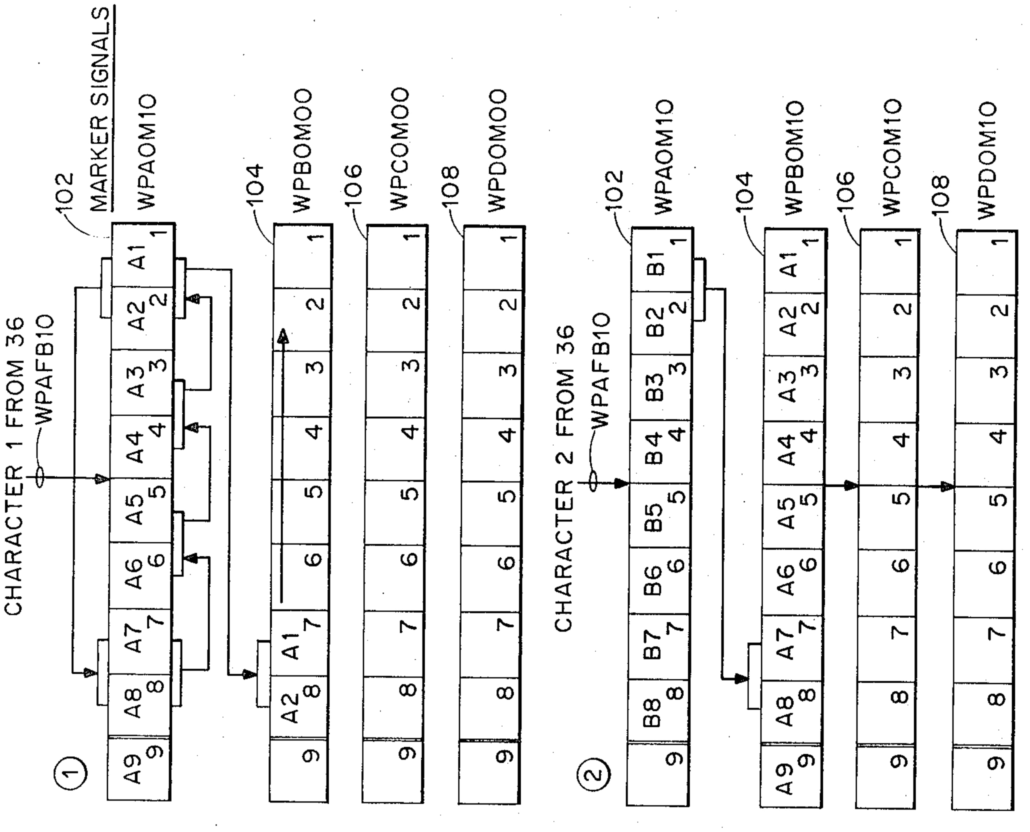

As seen from FIG. 2*c*, the transfer signal WPAFB10 switches the marker flip-flop 120-41 to its binary ONE state which forces signal WPAOM10 to a binary ONE as indicated by the marker signals in FIG. 3*a*. Shift counter 120-2 which had been previously cleared and had flip-flops 120-5 and 120-9 preset to their binary ONE states via AND gates 120-16 and 120-26, is now enabled for shifting. That is, the AND gate and amplifier circuit 120-36 forces signal WPSCA10 to a binary ONE when signal WPBFA10 is forced to a binary ONE by flip-flop 120-41. The signal WPBFA10 conditions register 102 to start shifting the contents of the low-order two flip-flops into bit positions 7 and 8 of register 104 as indicated at point "1" in FIG. 3*a*. At the same time, flip-flop 104-9 begins summing the parity bit signals generated by generator 112.

Starting from a count of 3, shift register counter 120-2 advances through counts 4, 5, and 6. After four shifts, it is seen at point "2" in FIG. 3*a* that the entire eight bits of the first character have been loaded into register 104. Also, at this time, the result of summing of the parity signals generated by parity generator circuit 112 for the entire eight bits of the first character now resides in flip-flop 104-9 of FIG. 2*a*. At a count of 6, signal WPSC610 switches to a binary ONE which, in turn, resets marker flip-flop 120-41 to a binary ZERO. This in turn forces signal WPBFA10 to a binary ZERO which inhibits further shifting of counter 120-2. Concurrently therewith, the next marker flip-flop 120-42 for register 104 is switched to its binary ONE state as indicated at "2" of FIG. 3*a*.

Since register 106 is empty, (i.e., signal WPCOMOO is a binary ONE), the AND gate and amplifier circuit 120-46 switches flip-flop 120-43 of register 106 to a binary ONE state by forcing signal WPCFB10 to a binary ONE. The last mentioned signal causes a parallel transfer of the 9 bit contents of register 104 into register 106. One PDA clock pulse later, AND gate and amplifier circuit 120-47 switches the marker flip-flip 120-44 of register 108 to a binary ONE by forcing signal WPDFC10 to a binary ONE. The signal WPDFC10 causes a parallel transfer of the contents of register 106 into register 108 as illustrated by the arrows in FIG. 3*a*. *The bits of the first character in register 108 are checked by parity checker circuit 114 in order to determine whether the transfer of data and parity bits had proceeded correctly. In the event that it did not, the circuit 114 forces signal EWDRP1A to a binary ONE. This signal is forwarded to error circuits within the controller, not shown, and the character is written with bad parity in order that it will be detected when it is later read. When the character has been written onto the magnetic medium, signal WPDMR10 conditions gate 120-74 to reset marker flip-flop 120-44 to a binary ZERO state. As soon as the next character arrives, signal WPAFB10 is forced to a binary ONE. The bits B1 through B9 of the second character are stored and the marker flip-flop 120-41 is again switched to a binary ONE. This forces signal WPBFA10 to a binary ONE which starts the shift counter 120-2 to start shifting through counts 4, 5, and 6.*

While it is possible to perform a 1×1 packing operation through a succession of parallel transfers through the registers 102 through 108, the arrangement just described enables the use of some control apparatus and the same data paths. This enhances the reliability of the arrangement in that a minimum of additional apparatus is required for packing data characters into all of the required formats.

Figure 3B:
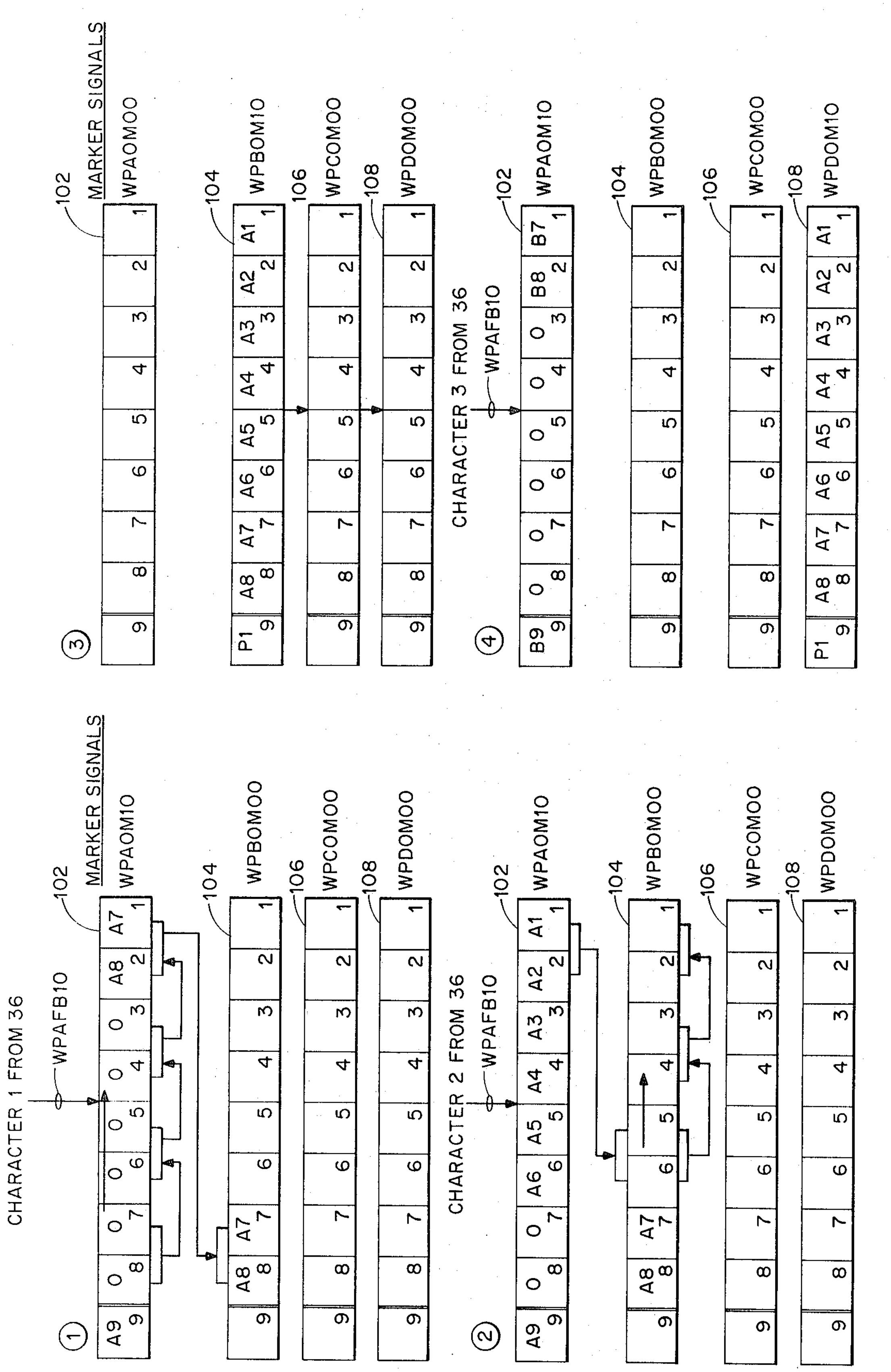

FIG. 3*b* illustrates the flow of data characters during different points of time in processing data characters transferred for storage in a 2×1 format. In the manner previously described, a command is operative to generate signals specifying a 2×1 format. This means that signals WPW1100 and WPW4310 are a binary ONE and binary ZERO. Also, signals WPW4320 and WPW2120 are a binary ONE and a binary ZERO. As in the 1×1 format, counter flip-flops 112-5 and 120-9 are preset to binary ONES. Thus, shift counter 120-2 will start from a count of 3.

Referring to FIG. 3*b*, it is seen that during a first interval, indicated at point "1," the nine bits of a first character are transferred into register 102 when signal WPAFB10 is forced to a binary ONE. This character includes the high-order bits 7 and 8 of the character to be stored which reside in the low-order two bit positions 1 and 2 of register 102. The transfer signal WPAFB10 causes the marker flip-flop of register 102 to switch to a binary ONE. This forces signal WPAOM10 to binary ONE as illustrated in FIG. 3b. Since register 104 is empty, the AND gate and amplifier circuit 120-45 of FIG. 2c forces signal WPBFA10 to a binary ONE which starts advancing shift counter 120-2 and shifting the contents of bit positions 1 and 2 of register 102 into bit positions 7 and 8 of register 104 two bits at a time. After one shift, at a count of three, AND gate 120-53 resets marker flip-flop 120-41 to a binary ZERO. This in turn forces signal WPBFA10 to a binary ZERO and inhibits further advancing of the shift counter 120-2. At a next time interval, designated as "2" in FIG. 3b, the nine bits are transferred into register 102 when signal WPAFB10 is again forced to a binary ONE. This character includes bits 1 – 6 of the character to be stored. At this time, signal WPAFB10 causes marker flip-flop 120-41 to switch to a binary ONE. This again causes signal WPBFA10 to be forced to a binary ONE which starts advancing the shift counter 120-2 through counts 4, 5, and 6. Also, at this time, AND gate and amplifier circuit 1280-80 forces WPBAR16 to a binary ONE enabling the shifting right of the contents of bit positions 1 and 2 register 102 into bit positions 5 and 6 of register 104 as illustrated in "2" of FIG. 3*b*.

When shift counter 120-2 reaches a count of 6, signal WPSC610 causes gate 120-60 to switch marker flip-flip 120-42 of register 104 to a binary ONE. Additionally, gate 120-53 causes marker flip-flop 120-41 to switch to a binary ZERO. This again forces signal WPBFA10 to a binary ZERO inhibiting further shifting of counter 120-2.

Figure 3C:
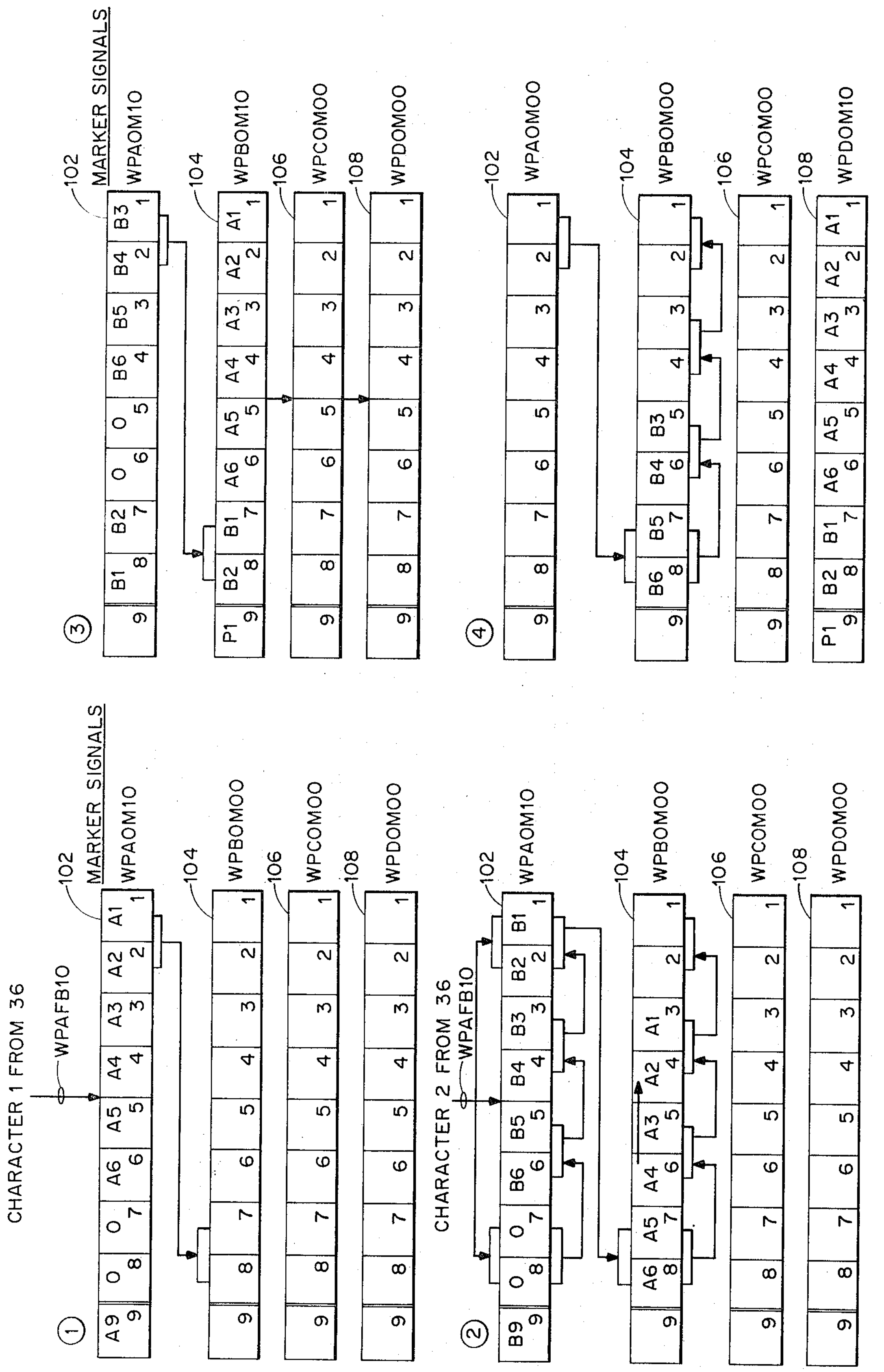
Figure 3D:
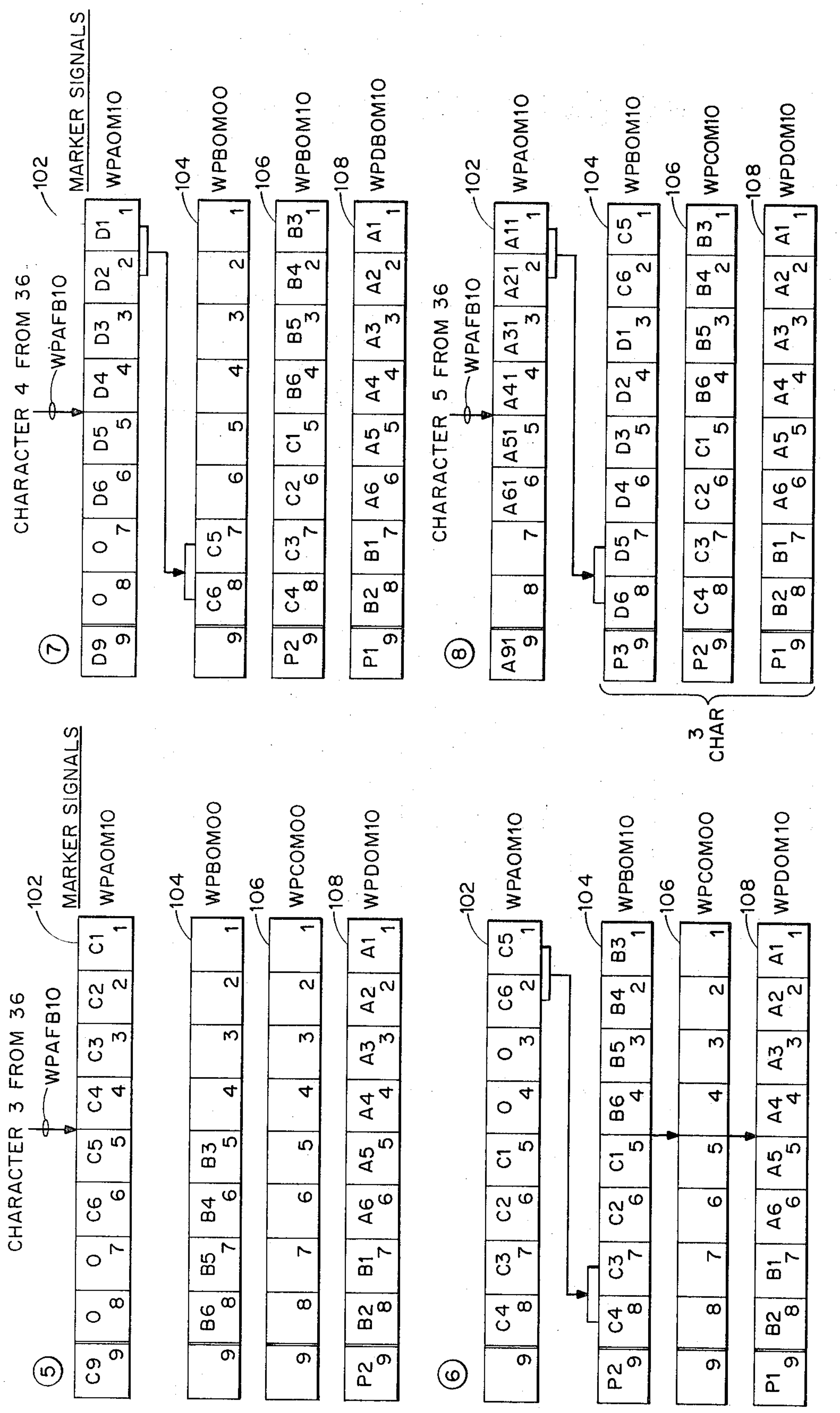

During the transfer operation, the parity generator circuit 112 of FIG. 3*d* generates parity bits for the contents of bit positions 1 and 2 of register 102, the result of which is summed by flip-flop 104-9 of register 104. At the completion of the transfer operation, a parity bit, designated P1 in "3" of FIG. 3*b*, for the eight bit contents resides in register 104. These 9 bits are transferred through registers 106 and 108 as illustrated by "4" of FIG. 3*b*. Again the transfers are accomplished through the successive switching of marker flip-flops 120-43 and 120-44 for registers 106 and 108 respectively.

Before the character is written on tape, parity checker circuit 114 performs a parity check on the contents of register 108 for determining whether all transfer and shifting operations have proceeded properly. The marker flip-flop of register 108 remains a binary ONE until the complete character has been transferred and written on tape. At that time, signal WPDMR10 is forced to a binary ONE which switches flip-flop 120-44 to a binary ZERO. When signal WPAFB10 is again forced to a binary ONE, a third character is stored in register 102. When the same cycle of operation is repeated, this results in the packing of a second character which includes the high order bits B7 and B8 of the third character.

FIG. 3*c* illustrates the data flow during different points of time in processing data characters transferred for storage in a 4×3 format. In this operation, as mentioned previously, the controller 10 is operative to convert a group of 4 six-bit characters from main storage into three frames which are written on tape. Again, in the manner described above, a command causes the generation of control signals specifying a 4×3 operation. In this instance, signals WPW1100 and WPW2120 are binary ONES and signal WPW4320 is a binary ZERO. However, signal WPW4310 is a binary ONE which presets flip-flop 120-3 of shift counter 120-2 to a binary ONE. This causes shift counter 120-2 to start from a count of 1.

Referring to FIG. 2*c*, it is seen that the shift counter 120-2 is operative to begin counting following the loading of the first character into register 102 in response to signal WPAFB10 being forced to a binary ONE. This causes signal WPBFA10 to be forced to a binary ONE which begins the advancing of the shift counter 120-2 and shifting of the contents of register 102 into register 104. The six bits of the character are shifted two bits at a time from bit positions 1 and 2 of register 102 into bit positions 7 and 8 of register 104. At the completion of three shifts, when the counter has advanced to a count 3, the six bits will have been stored in register 104. At this time, signal WPSC310 causes a marker flip-flop 120-41 of register 102 to be reset to a binary ZERO. This in turn forces signal WPBFA10 to a binary ZERO inhibiting the further advance of the counter 120-2. Signal WPAFB10 is again forced to a binary ONE upon the arrival of the next character. These bits, as shown in point "2" of FIG. 3*c*, are loaded into register 102 in response to signal WPAFB10 being forced to a binary ONE. This in turn forces marker flip-flop 120-41 to its binary ONE state thereby enabling the shift counter 120-2 to begin counting. When the next two bits have been shifted from the low-order two bit positions of registers 102 into register 104, the marker flip-flop 120-42 is forced to its binary ONE state in response to signals WPSC410 and WPFHF00 being forced to binary ONES. At this time, parity generator circuit 112 will have completed its generation of a parity check bit (i.e., P1 in FIG. 3c) for the eight bit character stored in register 104.

As indicated at points 3 and 4, the entire 9 bit contents of register 104 are transferred in parallel to register 106 and then to register 108 where the character is stored until it is written on the magnetic medium. Also, at this time, before writing, parity check circuit 114 performs a parity check upon the bits of the character to determine whether the shifting and transfer operation have proceeded correctly. When the character has been written onto the medium, signal WPDMR10 is operative to reset marker flip-flop 120-44 of FIG. 2*c* to its binary ZERO state.

Continuing on with the 4×3 operation, before writing of the character stored in register 108 occurs, a third six bit character is loaded into register 102 in response to signal WPAFB10 being forced to a binary ONE. This is agian operative to cause marker flip-flop 120-41 to be switched to its binary ONE state which again starts the shift counter 120-2 to advance throught counts 1 through 3. When the shift counter 120-2 has advanced to a count of 2, it is seen from point 6 of FIG. 3d that the bits of a second complete character will have been assembled in register 104. At this time, gate 120-61 switches marker flip-flop 120-42 to a binary ONE. This in turn inhibits further shifting of counter 120-2 by forcing signal WPBFA10 to a binary ZERO. Since register 106 is empty at this time, the contents of register 104 are transferred into register 106 when signal WPCFB10 is forced to a binary ONE by marker flip-flop 120-42. The same signal also switches marker flip-flop 120-43 of register 106 to its binary ONE state. As soon as this happens, marker flip-flop 120-42 or register 104 is reset to its binary ZERO state. This enables signal WPBFA10 to be again forced to a binary ONE which allows the shift counter 120-2 to advance from a count of 2 to a count of 3. As indicated at point 7, this causes bits 5 and 6 of the third character to be shifted into register 104. At this time, marker flip-flop 120-41 switches to a binary ZERO and this inhibits the advance of counter 120-2 until the arrival of the next or fourth character.

When signal WPAFB10 is again forced to a binary ONE, the fourth character is loaded into register 102. The shift counter 120-2 is again enabled and after three shifts, register 104 will have been loaded with the complete third character as illustrated at point 8 of FIG. 3*d*. Because register 104 contains a full character, marker flip-flop 120-42 prevents marker flip-flop 120-41 of register 102 from being reset to its binary ZERO state in response to signal WPSC610. Accordingly, as soon as one of the registers (i.e., register 108) becomes empty, the above described operations will be repeated and result in the packing of the next 4 characters from main storage into three frames for writing onto the magnetic medium.

From the above, it is seen that the various portions of the packing buffer section 100 are utilized to assemble data characters into any one of a number of different formats. By presetting certain one or ones of the flip-flops of shift counter 120-2, the required sequence of control signals are generated by control circuits 120 for the shifting and transferring of data characters for storage in a given format. As mentioned, a similar arrangement is utilized to perform the depacking operations. This arrangement will now be described.

Detailed Description of Operation of the Depacking Buffer Section 200

Referring to FIGS. 1, 2*e* through 2*g*, and 4*a* through 4*i*, the operation of this section will now be described. FIG. 4*a* illustrates the states of registers 201 and 204 and associated marker flip-flops at different points of time when the controller 10 depacking data characters in a 1×1 format. It is assumed that the magnetic medium is being read in a forward direction and all registers have been cleared to ZEROS. When all of the bits of a character have been assembled by the "deskew"

buffer circuits 42 of FIG. 1, transfer signal RSAF310 is forced to a binary ONE which in turn results in the character being stored in register 202. At that time, parity checker circuit 210 is operative to check the character for parity and generate a signal to error circuits, not shown, when the character has bad parity.

Referring to FIG. 2g, it is seen that the mode signals RDR4310 and RDR211Z applied to inverter circuit 220-39 force signal RDSCL20 to a binary ONE. This signal presets both flip-flops 220-2 and 220-9 to binary ONES. When signal RSAF310 switches to a binary ONE, it in turn forces signal RDSAM10 to a binary ONE. This signal switches marker flip-flop 220-41 of FFIG. 2g to a binary ONE. This in turn forces transfer signal RDBFA10 to a binary ONE which conditions register 202 for storing the first character. Because a 1×1 format is specified, inverter circuit 220-85 forces signal RDSRT20 to a binary ONE. This signal together with signal RDBFA10 defines that the information bits are to be shifted left as indicated in FIG. 4a. More specifically, the signals RDSRT20 and RDBFA10 cause gate and amplifier circuit 202-49 of FIG. 2e to force signal RDSL210 to a binary ONE (i.e., signal RDL1110 is normally a binary ONE). The same signals condition AND gate and amplifier circuit 220-84 to force signal RDBAL10 to a binary ONE which conditions register 204 to shift its contents left by two bit positions as shown in FIG. 4a. During shifting, the contents of bit positions 7 and 8 are loaded into the low order two bit positions of register 204. Signal RDBFA10 conditions AND gate and amplifier circuit 200-36 to force signal RDSCA10 to a binary ONE which starts advancing the shift counter 220-2 through counts 3 through 6. The signal RDBAL10 conditions AND gate and amplifier circuit 204-49 of FIG. 2g to apply the parity signal RDP7810 generated by the circuit 212 of FIG. 2h to flip-flop 204-9 of FIG. 2g. That is, the parity bit for the character is derived from the contents of bit positions 7 and 8 of register 202. Thus, as the contents of register 202 are loaded into the low order two bit positions of register 204 from the high order bit positions 7 and 8 of register 202, the parity circuit 212 of FIG. 2h generates a parity bit signal for each pair of bits. The flip-flop 204-49 sum the parity bit signals during the shifting (i.e., when signal RDBFA10 is a binary ONE). When the shift counter 220-2 advances to a count of 6, AND gate 220-61 resets marker flip-flop 220-41 to a binary ZERO. This in turn causes AND gate and amplifier circuit 220-45 to force signal RDBFA10 to a binary ZERO. This inhibits further advancing of shift counter 220-2 by causing AND gate and amplifier circuit 220-36 to force signal RDSCA10 to a binary ZERO.

It will be noted at the count of 6, register 204 contains the eight bits of the first character. At that time, gate 220-64 forces marker flip-flop 220-42 to a binary ONE. This is indicated at point "2" in FIG. 4a. At this time, parity generation is complete and the parity which will have been (i.e., P1) now resides in flip-flop 204-9 of FIG. 2d. As soon as the first character is written into storage section 206 of FIG. 1, signal MAAF11D causes gate and inverter circuit 220-72 to force signal RDBOHIH to a binary ZERO which resets register 204 to ZEROS.

The same above described operation takes place when the data characters are being read while the t. pe moves in a reverse direction. That is, the same control signals are generated to cause the eight bits of the first data character loaded into register 202 to be shifted left until they have been loaded into register 204 as illustrated by FIG. 4a.

FIG. 4b discloses the states of the registers 202 and 204 during different points of depacking data characters in a 2×1 format. Initially, the peripheral controller 10 is conditioned to transfer data characters in a 2×1 format by a command which results in signal RCR211Z being forced to a binary ONE. At this time, signals RCR1120 and RCR4320 are binary ONES while signal RCR4310 is a binary ZERO. Since it is assumed that the tape is being read in a forward direction, control signal RCRBK10 is also binary ZERO. Initially, shift counter 220-2 is cleared and flip-flops 220-5 and 220-9 are preset to binary ONES.

Upon the arrival of a first data character from the deskew buffer circuits 42, strobe signal RSAF310 is forced to a binary ONE which causes the eight bits of the character from the deskew buffer circuits 42 to be loaded into register 202. This is indicated at point "1" of FIG. 4b. Also, the signal RSAF310 forces signal RDSAM10 to a binary ONE which switches marker flip-flop 220-41 to a binary ONE. This in turn forces signal RDBFA10 to a binary ONE which enables the shift counter 202-2 to begin shifting by causing signal RDSCA10 to be forced to a binary ONE. Also, signal RDBFA10 enables flip-flop 204-9 to sum the parity signals generated by circuit 212. At this time, signal RDSRT20 is a binary ONE which causes registers 202 and 204 to shift left as previously described.

After the contents of registers 202 and 204 have been shifted two bits left once, the two bits A7 and A8 reside in the low order bit positions of register 204 as indicated at point 2 in FIG. 4b. At this time, AND gate 220-63 forces marker flip-flop 220-42 of FIG. 2g to a binary ONE. This in turn inhibits further shifting of counter 220-2 by forcing signal RDBFA10 to a binary ZERO. The operation of flip-flop 204-9 also is inhibited. The contents of register 204 including bits 7 and 8 together with the parity bit P1 are then written into the data buffer storage section 206 as a first unpacked data character.

Upon completion of the writing operation, signal MAAF11D is forced to a binary ONE which resets marker flip-flop 220-42 and register 204 to binary ZEROS. This again forces signal RDBFA10 to a binary ONE which in turn enables the shift counter 220-2 to begin counting and flip-flop 204-9 to beging summing parity signals. When the counter 220-2 has advanced through counts 4, 5, and 6, the bits A1 through A6 will have been stored in register 204, as indicated at points 3 and 4 of FIG. 4b. At this time, marker flip-flop 220-41 switches to a binary ZERO while marker flip-flop 220-42 switches to a binary ONE. The parity bit (P2) for the eight bits of the second character stored in register 204 resides in flip-flop 204-9 of FIG. 2e. The entire nine bit contents of register 204 are written into the storage 206 as indicated at point 4 in FIg. 4b.

FIG. 4c illustrates the states of the same registers when the controller 10 depacks data characters in a 2×1 format in which the tape being read is moving in a reverse direction. The significant difference between the operation of the controller 10 as compared with the previously described operation is that the registers 202 and 204 are conditioned to have their contents shifted right such that the contents of the low two bit positions of register 202 are shifted two bits at a time into bit positions 5 and 6 of register 204. This is indicated at point 1 in FIG. 4c.

In greater detail, initially, signal RSAF310 is forced to a binary ONE when all of the bits of a complete character have been assembled by deskew buffer circuits 42. At this time, the bits of a first frame are loaded into register 202. Signal RDSAM10 is forced to a binary ONE which switches marker flip-flop 220-41 to a binary ONE. This in turn forces signal RDBFA10 to a binary ONE which enables the shift counter 220-2 to start shifting. As in the previously described operation, the counter 220-2 will have been preset to a certain state. Because signals RCR211Z and RCRBK10 are both binary ONES, AND gate and amplifier circuit 220-38 preset flip-flop 220-3 to a binary ONE. At the same time, flip-flop 220-9 is preset to a binary ONE by signal RCR4320. Additionally, AND gate 220-81 forces signal RDSRT10 to a binary one which conditions both the registers 202 and 204 to be shifted right. That is, when signal RDBFA10 switches to a binary ONE, AND gate and amplifier circuits 220-86 and 202-48 force signals RDBAR14 and RDSR210 to binary ONES. Also, AND gate and amplifier circuit 220-90 forces signal RDBAR58 to a binary ONE. These signals as seen from FIG. 2e condition the flip-flops of registers 202 to shift the contents of bit positions 1 and 2 into bit positions 5 and 6 of register 204. Also, signals RDBAR14 and RDBFA10 enable flip-flop 204-9 to start summing the parity signal RDP1210 from circuit 212.

When counter 220-2 advances to a count of 3, this causes AND gate 220-63 to switch marker flip-flop 220-42 to a binary ONE. This in turn conditions AND gate and amplifier circuit 220-45 to force signal RDBFA10 to a binary ZERO which inhibits further advance of counter 220-2. As indicated at point 2 of FIG. 4*c*, the bits of a first depacked character are now stored in register 204. Additionally, the parity bit P1 generated by parity generator circuit 212 now resides in bit position 9 of register 204. Bits A1 through A6, ZEROS in bit positions 7 and 8 together with the parity bit, P1, are written into the data buffer storage section 206. When the writing operation is complete, signal MAAFI1D is forced to a binary ONE which in turn switches marker flip-flop 220-42 and register 204 to binary ZEROS. This is indicated at point 3 in FIG. 4*c*.

The resetting of marker flip-flop 220-42 causes AND gate and amplifier circuit 220-45 to force again signal RDBFA10 to a binary ONE which enables the counter 220-2 to begin advancing through counts 4 and 5. When the counter has advanced to a count of 5, inverter circuit 220-89 forces signals RDBAR5A and RDBAR58 to binary ZEROS. This causes binary ZEROS to be shifted into register 204 as indicated at point 4 in FIG. 4c. When the shift counter 220-2 reaches a count of 6, gates 220-61 and 220-64 respectively switch marker flip-flop 220-41 to a binary ZERO and marker flip-flop 220-42 to a binary ONE. At this time, bits A7 and A8, 6 ZERO bits and the odd parity bit (P2) now reside in register 204. The contents of register 204 are written as a second depacked character into the storage section 206 completing a first cycle of operation. At the completion of the writing operation, marker flip-flop 220-42 is reset to its binary ZERO state along with the flip-flops of register 204. The same cycle of operation is repeated to depack the remaining date characters read from the magnetic medium.

FIGS. 4*d* through 4*f* disclose the states of registers 202 and 204 and marker flip-flops at various points in depacking data characters stored in a 4×3 format. Here the data characters are being read when the tape is moving in a forward direction. Referring first to FIG. 2*g*, it will be noted that signal RCR4310 is a binary ONE while signal RCR4320 is a binary ZERO. This causes the shift counter 220-2 to be preset to a count of one. That is, flip-flop 220-3 is switched to its binary ONE state. Also, signal RCRFW10 is a binary ONE and this signal and signal RCR4310 condition AND gate 220-82 to force signal RDSRT10 to a binary ONE. This conditions the registers 202 and 204 to have their contents shifted to right. That is, signals RDBAR14, RDBAR58 and RDSR210 are all forced to binary ONES when AND gate and amplifier circuit 220-45 switches signal RDBFA10 to a binary ONE. This occurs when the deskew circuits 42 have assembled all of the bits of a first frame which causes signal RSAF310 to be forced to a binary ONE. This in turn forces signal RDSAM10 to a binary ONE which switches marker flip-flop 220-41 to a binary ONE.

As indicated at point 1 in FIG. 4d, register 202 is conditioned by signal RDBFA10 to store the bits of frame 1. Also, when signal RDBFA10 is forced to a binary ONE, it enables shift counter 220-2 to start advancing and flip-flop 204-9 to start summing parity signals. This causes the contents of register 202 to be shifted two bits at a time from bit positions 1 and 2 into bit positions 5 and 6 of register 204. shifting takes place as indicated at point 2 in FIG. 4*d*. When the counter reaches a count of 6, gate 220-64 switches marker flip-flop 220-42 to a binary ONE. This causes gate 220-45 to force signal RDBFA10 to a binary ZERo which inhibits further advancing of shift counter 220-2. As seen from point 2, the parity check bit P1 generated from bit positions 1 and 2 of register 202 for bits A1 through A6 of a first character also resides in bit position 9 of register 204. The entire nine bits are written as a first character into storage section 206. At that time, signal MAAFI1D is forced to a binary ONE which causes marker flip-flop 220-42 to switch to a binary ZERO as indicated at point 3 in FIG. 4*d*. This conditions gate 220-45 to force signal RDBFA10 to a binary ONE which causes shift counter 220-2 to start counting again.

When the counter 220-2 reaches a count of 4, AND gate 220-52 switches marker flip-flop 220-41 to a binary ZERO. This forces signal RDBFA10 to a ZERO which resets register 202 to binary ZEROS indicated at point 4 of FIG. 4*d*. The controller 10 remains in this condition until all of the bits of a second frame have been assembled by deskew buffer circuits 42 which again forces signal RSAF310 to a binary ONE. As indicated at point 5 of FIG. 4*e*, signal RSAF310 causes B1 through B9 of the second frame to be loaded into register 202. That is, the signal causes marker flip-flop 220-41 to be again switched to a binary ONE which forces signal RDBFA10 to a binary ONE. This signal enables register 202 to store frame 2 and starts the shift counter 220-2 to start advancing through counts 5 and 6. When the counter reaches a count of 6, gate 220-66 switches marker flip-flop 220-42 to a binary ONE. This forces signal RDBFA10 to a binary ZERO which inhibits counter 220-2 from advancing. As indicated at point 6 in FIG. 4*e*, register 204 contains the bits of a second depacked character. This character including parity bit P2 is written into the storage section 206. At the completion of the writing operation, signal MAAFI1D resets flip-flop 220-42 to a binary ZERO as indicated at point 7 in FIG. 4e. This in turn forces signal RDBFA10 to a binary ONE thereby enabling shift counter 220-2 to begin advancing. It will be noted that following a count of 6, AND gate 220-25 switches flip-flop 220-9 to a binary ONE indicating that the counter is sequencing through a second group of counts (i.e., states 6 through 12). Also AND gate 220-11 switches flip-flop 220-3 to a binary ONE. When the shift counter has advanced to a count of 2, AND gate 220-53 switches flip-flop 220-41 to a binary ZERO as indicated at point 8 in FIG. 4e. Also, at this time, signal RDBFA10 clears register 202 to binary ZEROS.

The controller 10 remains in the above state until the deskew buffer circuits 42 transfer the third frame. At this time, signal RSAF310 is forced to a binary ONE which forces signal RDSAM10 to a binary ONE. This switches marker flip-flop 220-41 to a binary ONE state which forces signal RDBFA10 to a binary ONE enabling shift counter 220-2 and parity flip-flop 204-9. When the counter 220-2 reaches a count of 3, AND gate 220-63 switches marker flip-flop 220-42 to a binary ONE indicated at point 10 in FIG. 4f. This disables counter 220-2 and parity flip-flop 204-9. At this time, bits B5 through B8, bits C1, C2, and parity bit P3 of a third character reside in register 204. The 9 bits of character 3 are written into the storage section 206. At this time, signal MAAFI1D is again forced to a binary ONE which switches marker flip-flop 220-42 to a binary ZERO and clears register 204 to ZEROS as indicated at point 11 in FIG. 4f. This in turn allows gate 220-45 to force signal RDBFA10 to a binary ONE which again enables shift counter 220-2 and flip-flop 204-9.

When the counter reaches a count of 6, gate 220-64 switches marker flip-flop 220-42 to a binary ONE. At the same time, signals RDFHF10 and RDSC610 condition gate 220-61 to switch marker flip-flop 220-41 to a binary ZERO as indicated at point 12 of FIG. 4*f*. At this time, bits C3 through C8 and parity bit P4 of character 4 reside in register 204. When the entire contents of register 204 have been written into storage section 206, signal MAAFI1d resets the marker flip-flop 220-42 and register 204 to binary ZEROS. This completes a cycle of operation for depacking data characters stored in a 4×3 format.

FIGS. 4*g* through 4*i* disclose the states of registers 202 and 204 and associated marker flip-flop at different points of time when the controller 10 is processing data characters stored in a 4×3 format. Here, the original command specifies that the data characters are being read when the tape is moving in a reverse direction. From these Figures, it will be noted that the data flow is similar to that just described with the exception that the characters are transferred from the deskew buffer circuits 42 in reverse order and as a result are written into storage section 206 in reverse order. Also, the contents of registers 202 and 204 are shifted in an opposite direction (i.e., left).

In greater detail, since signal RCRFW10 is a binary ZERO, amplifier circuit 220-83 forces signal RDSRT10 to a binary ZERO. This causes inverter circuit 220-85 to force signal RDSRT20 to a binary ONE, enabling the contents of both registers 202 and 204 to be shifted left as described herein. As indicated at point 1 in FIG. 4*g*, the signal RSAF310 when forced to a binary ONE, switches marker flip-flop 220-41 to a binary ONE which loads bits C1 through C9 into register 202 (i.e., forces signal RDBFA10 to a binary ONE). Signal RDBFA10 allows the counter 220-2 to advance through successive counts and enables flip-flop 204-9. When the contents of the registers 202 and 204 have been shifted to the left 3 times (i.e., counter is at a count of 3) the bits of character 4 (i.e., the first depacked character) now reside in register 204. At a count of 3, gate 220-63 switches marker flip-flop 220-42 to a binary ONE state as indicated at point 2 in FIG. 4g. This causes gate 220-45 to force signal 220-45 to a binary ZERO which inhibits further advancing of counter 220-2.

As soon as character 4 is written into the storage section 206, signal MAAFI1D causes marker flip-flop 220-42 and register 204 to be switched to binary ZEROS as indicated at point 3 in FIG. 4g. The resetting of the marker flip-flop 220-42 enables shift counter 220-2 and parity flip-flop 204-9. When the counter reaches a count of 4, AND gate 220-52 switches marker flip-flop 220-41 to a binary ZERO. This causes gate 220-45 to force signal RDBFA10 to a binary ZERO disabling counter 220-2 and parity flip-flop 204-9. Also, signal RDBFA10 clears register 202 to ZEROS as indicated at point 4 in FIG. 4*g*. At this time, the first two bits of the next character (i.e., C1 and C2) reside in register 204. The controller 10 remains in this state until the second frame applied to register 202 at which time signal RSAF310 is forced to a binary ONE.

As indicated at 5 in FIG. 4*h*, signal RSAF310 causes marker flip-flop 220-41 to again switch to a binary ONE. This again forces signal RDBFA10 to a binary ONE which enables both the shift counter 220-2 and parity flip-flop 204-9. When the counter reaches a count of 6, gate 220-64 switches marker flip-flop 220-42 to a binary ONE as indicated at point 6 in FIG. 4h. At this time, all of the bits of the third character including parity bit P3 (i.e., second depacked character) reside in register 204. At a count of 6, both flip-flops 220-3 and 220-9 are switched to binary ONES which starts counter 220-2 through counts 1 through 6.

When character 3 is written into storage section 206, signal MAAFI1D switches flip-flop 220-42 and register 204 to binary ZEROS as indicated at point 7 in FIG. 4*h*. The switching of marker flip-flop 220-42 forces signal RDBFA10 to a binary ONE which allows shift counter 220-2 to again begin shifting. When counter 220-2 reaches a count of 2, AND gate 220-53 switches marker flip-flop 220-41 to a binary ZERO. This forces signal RDBFA10 to a binary ZERO clearing register 204 to ZEROS as indicated at point 8 in FIG. 4h. Signal RDBFA10 in turn inhibits further operation of the shift counter and parity flip-flop 204-9 until frame 1 is applied to register 202 as indicated at point 9 in FIG. 4*i*. At this time, signal RSAFB10 switches marker flip-flop 220-41 to a binary ONE which forces signal RDBFA10 to a binary ONE. This enables counter 220-2 and parity flip-flop 204-9. When the counter 220-2 reaches a count of 3, gate 220-63 switches marker flip-flop 220-42 to a binary ONE as indicated at point 10 in FIG. 4*i*. This forces signal RDBFA10 to a ZERO which inhibits the operation of shift counter 220-2 and parity flip-flop 204-9. At this time, all of the bits of character 2 (third depacked character) including parity bit P2 reside in register 204.

As soon as character 2 is written into storage section 206, signal MAAFI1D switches marker flip-flop 220-42 and register 204 to binary ZEROS. This is indicated at point 11 in FIG. 4*i*. At this time, the gate 220-45 forces signal RDBFA10 to a binary ONE enabling shift counter 220-2 to advance through counts 4, 5, and 6. Upon reaching a count of 6, gates 220-61 and 220-64 switch marker flip-flops 220-41 and 220-42 to a binary ZERO and a binary ONE respectively. This forces signal RDBFA10 to a binary ZERO which clears register 202 to ZEROS as indicated at point 12 in FIG. 4i. At this time, the bits of character 1 (i.e., fourth depacked character) including parity bit P1 now reside in register 204. When this character has been written into storage section 206, signal MAAFI1D will again force marker flip-flop 220-42 and register 204 to binary ZEROS completing a 4×3 cycle of operation. Also, signals RDSCB10 and RDSCA10 are both forced to ZEROS conditioning the counter 220-2 for a new cycle of operation.

From the foregoing, it is seen that the apparatus of the present invention is able to pack and depack respectively characters into one of a number of specified formats for storage onto a magnetic medium and for transfer to a CPU. In accordance with the invention, the transfer and parity generation operations proceed as the data characters are being received. Hence, the transfer of data characters is facilitated in that the operations being performed in no way delay that transfer. More importantly, the apparatus of the present invention by generating the required parity bits concurrent with the transfer operations is able to verify whether such operations have proceeded properly. This arrangement in addition to providing greater reliability also facilitates detecting which portion or portions of the peripheral controller has produced an error. It will be appreciated that many changes may be made to the embodiment illustrated without departing from the spirit of the present invention. For example, the number of formats may be modified. Also, even parity may be used.

While in accordance with the provision and statute there has been illustrated and described the best form of the invention known, certain changes may be made without departing from the spirit of the invention as set forth in the appended claims and that in some instances, certain features of the invention may be used to advantage without a corresponding use of other features.

Having described the invention, what is claimed as new and novel is:

1. A peripheral controller system coupled to an input/output bus and to at least one magnetic tape peripheral device, said system including apparatus for packing bits of data characters having a first number of data bits received from said bus, into characters arranged in any one of a number of predetermined formats and having a second number of data bits, said apparatus comprising:

a plurality of register storage means coupled in series, each register means having a plurality of bistable stages, a first register means being coupled to receive bits of said data character signals in parallel from said bus and a last register means being coupled to transfer in parallel bits of packed data character signals in said one predetermined format to said device;

modulo generation means coupled to said first register means and to a second one of said register means, said generation means being operative to generate intermediate check signals for groups of bits of said data character signals for application to at least a predetermined stage of said second register means; and control means coupled to said plurality of register storage means, said control means coupled to receive a number of mode control signals, said control means being responsive to said mode control signals to condition said stages of said first and second register means and said generator means respectively to pack said data characters as received from said bus by shifting the bits of said characters from said first register means into second register means forming characters having said second number of data bits arranged in said one predetermined format and concurrently generate said intermediate check signals applied to said predetermined stage of second register means for producing at least one resulting check bit for each of said data characters for transfer through the remaining ones of said plurality of register means with corresponding ones of said data characters for enabling subsequent verification that said data characters were packed and transferred without error.

2. The system of claim 1 wherein said generator means includes gating means connected to a first predetermined group of stages of said first register means and being operative to generate an intermediate check signal for each group of bits of said data characters received by said first register means and wherein said predetermined one of said stages of said second register means includes input gating means connected to said gating means, said input gating means in response to said intermediate check signals conditioning said predetermined stage to complement state for producing a resulting check bit for said second number of data bits constituting said data character stored in said second register means.

3. The system of claim 2 wherein said first register means includes;

first gating means for connecting different groups of said stages to shift groups of bit positions at a time in a predetermined direction and to recirculate end around the bits of data characters stored therein and wherein said second register means includes;

first gating means for connecting different groups of stages of said second register means to shift groups of bit positions at a time in a predetermined direction the bits of data characters stored therein and wherein said apparatus further includes:

first transfer gating means connecting said first predetermined group of stages of said first register means to a first predetermined group of stages of said second register means for transfer of bit signal representations of said groups of bits of said characters stored in said first register means to said second register means; and said control means being coupled to said first gating means of said first and second register means and including means operative to generate sets of control signals to condition each said first gating means and said first transfer means for shifting a predetermined number of times said bits of said data characters upon being received from said bus and stored in said first register means concurrent with shifting the bits transferred to said second register means and generating said intermediate check signals so that upon termination of said shifting have packed in said second register data characters arranged in said one format and each having said second predetermined number of data bits and check bits.

4. The system of claim 3 wherein each said group corresponds to a pair of data bits of said data characters and wherein said gating means includes exclusive or circuits connected to generate an intermediate checking signal for each pair of bits stored in said first predetermined pair of stages of said first register means.

5. The system of claim 4 wherein said first predetermined pair of stages corresponds to the low order two bit positions of said first register means and wherein said first predetermined pair of stages and said predetermined stage of said second register means correspond to the high order two bit positions and check bit position respectively.

6. The system of claim 1 wherein said apparatus includes character checking means connected to said last register means, said checking means being operative to generate a check bit signal for said second predetermined number of data bits of each packed data character stored in said last register means for comparison with the check bit stored in said last register for verifying that the transfer and packing of data characters have proceeded without error.

7. The system of claim 6 wherein said means of said character checking means includes an odd parity generator circuit.

8. The system of claim 1 wherein said means of said control means includes:

shift counter means for generating sets of sequence control signals, said shift counter means having a plurality of bistable stages connected serially, and including means for receiving said mode control signals coded to specify said any one of said plurality of formats for initially presetting certain ones of said counter stages to predetermined states; and, logic control circuits coupled to predetermined ones of said shift counter stages and coupled to receive said mode control signals, said logic control circuits being conditioned by said mode control signals to enable the advancing of said shift counter means through predetermined sequences of counts repetitively for generating said sets of control signals required for packing said bits of said data characters arranged in said one format and having said second predetermined number of data bits and at least one check bit.

9. The system of claim 8 wherein different codings of said mode control signals condition said shift register control means to pack said bits of said data characters into one by one character format wherein said first number of bits of each data character transferred to said first register means are packed in said second register means into a single data character having said second number of bits, two by one character format wherein said first number of bits of two data characters transferred in succession to said first register means are packed in said second register means into a single character having said second number of bits and four by three character format wherein said first number of bits of four data characters transferred in succession to said first register means are packed in said second register means into those successive characters having said second number of bits by shifting the bit contents of said first and second register means a predetermined number of times during a cycle of operation for a number of cycles required for the format specified.

10. A peripheral controller system coupled to an input/output bus and to at least one magnetic tape peripheral device, said system including apparatus for depacking data characters having a first number of data bits received from said peripheral device into data characters arranged into any one of a number of formats and having a second number of bits, said apparatus comprising:

a plurality of register storage means coupled in series, each register means having a plurality of bistable stages, a first register means being coupled to receive bits of said data characters in parallel from said device and a second register means being coupled to transfer bits of depacked data characters in parallel in said one format to said input/output bus;

modulo generation means coupled to receive signals from said first register means and operative to generate intermediate check bit signals for groups of bits of said data characters for applying to at least a predetermined stage of said second register storage means; and, control means coupled to said first and second register means and coupled to receive a number of mode control signals, said control means being responsive to said mode control signals to condition said first and second register means and said generator means respectively to depack said data characters as they are received from said device by shifting the bits of said characters from said first register means into said second register means forming characters having said second number of data bits arranged in said one format and concurrently generate said intermediate check signals applied to said predetermined stages of said second register means for producing at least one resulting check bit for each of said data characters for subsequent transfer with corresponding ones of said data characters to said bus for enabling subsequent verification that of said data characters were depacked and transferred without error.

11. The system of claim 10 wherein said generator means includes:

first gating means connected to a first predetermined group of stages of said first register means and operative to generate an intermediate check signal for each group of said data character bits received by said first register means and second gating means connected to a second different predetermined group of stages of said first register means and operative to generate an intermediate check signal for said each group of data character bits and wherein said predetermined stage of said second register means includes input gating means coupled to said control means and conditioned selectively to receive intermediate check signals from said first and second gating means, said input gating means in response to said check signals conditioning said predetermined stage to complement state for producing a resulting check bit for said second number of bits stored in said second register means.

12. The system of claim 11 wherein each said group corresponds to a pair of data bits and wherein said first and second gating means each includes exclusive or circuits connected to generate said intermediate check signals for each pair of bits stored in said first predetermined pair of stages of said first register means.

13. The system of claim 12 wherein said first register means further includes:

first gating means for connecting different groups of said plurality of stages to shift groups of bit positions at a time in a first predetermined direction and to recirculate end around the bits of data characters stored therein;

second gating circuit means for connecting said different groups of said plurality of stages to shift groups of bit positions at a time in a second predetermined direction and to recirculate end around the bits of said data characters stored therein; and wherein said second register means further includes first gating means for connecting different groups of said plurality of stages of said second register means to shift groups of bit positions at a time in a predetermined direction of the bits of data characters stored therein and wherein said apparatus further includes:

first transfer gating means connecting said first predetermined group of stages of said first register means to a first predetermined group of stages of said second register means for transfer of signal representations of groups of bits of data characters stored in said first register means to said second register means and second transfer gating means connecting said different second predetermined group of stages of said first register means to a second different predetermined group of stages of said second register means for transfer of signal representations of said groups of bits of said data characters stored in said first register means to said second register means, and said control means being coupled to each of said gating means of said first and second register means and to said first and second transfer gating means, said control means being operative during when said device reads tape in one direction to condition said first gating means and a selected one of said transfer gating means by said sets of control signals for shifting a predetermined number of times in said first predetermined direction groups of data character bits received from said device and stored in said first register means concurrent with shifting in said first predetermined direction the bits transferred to said second register means and generating said intermediate check signals so that upon termination of said shifting to have depacked in said second register means data characters arranged in said one format and each having said second predetermined number of data and check bits and said control means being operative when said device reads tape in an opposite direction to condition said second gating means and a selected one of said transfer gating means by said sets of control signals for shifting a predetermined number of times in said second predetermined direction groups of data characters received from said device and stored in said first register means concurrent with shifting in said second predetermined direction the bits transferred to said second register means and generating said intermediate check signals so that upon termination of said shifting to have depacked in said second register means data characters arranged in said one format and each having said second predetermined number of data and check bits.

14. The system of claim 13 wherein said different groups of said stages correspond to different pairs of said stages and wherein said first predetermined and second predetermined groups of stages of said first register means correspond to the high order two data bit positions and low order two positions respectively of said first register means and wherein said first predetermined and second predetermined groups of stages of said second register means correspond to the low order two bit positions and high order two bit positions respectively of said second register means.

15. The system of claim 10 wherein said control means includes:

shift counter means for generating sets of sequence control signals, said shift counter means having a plurality of serially connected bistable stages and including means for receiving said number of mode control signals coded to specify a plurality of formats and operative initially to preset certain ones of said counter stages to predetermined states; and, logic control circuit means coupled to predetermined ones of said shift counter stages and to receive said mode control signals, said logic control circuit means being conditioned by said mode control signals to enable the advancing of said shift counter means through predetermined sequences of counts repetitively for generating said sets of control signals for depacking said bits of said data characters arranged in said one format and having said second predetermined number of data bits and at least one check bit.

16. The system of claim 15 wherein different codings of said mode control signals condition said shift register control circuit means to depack said bits of said data characters into one by one character format wherein said first number of bits of each character transferred to said first register means are depacked in said second register means into a single data character having said second number of bits, two by one character format wherein said first number of bits of each data character transferred to said first register means are depacked in said second register means into two data characters in succession each having said second number of bits and four by three character format wherein said first number of bits of three data characters transferred in succession to said first register means are depacked in said second register means into four data characters in succession each having said second number of bits by shifting the bit contents of said first and second register means a predetermined number of times during a cycle of operation for a number of cycles required for the format specified.

17. A peripheral controller system coupled to an input/output bus and to at least one magnetic tape peripheral device for packing and depacking data characters, each including a number of bits, to be written and read respectively onto/from a magnetic tape medium, said controller system comprising:

first buffer storage means, said first buffer means coupled to receive bits of said data characters in parallel from said bus for transfer in parallel to said magnetic tape device for recording on said medium, said first buffer storage means including;

a plurality of register storage means coupled in series, each register storage means having a plurality of bistable stages, a first register storage means being coupled to receive bits of data characters in parallel from said bus and a last register storage means being coupled to transfer bits of packed data characters in parallel to said device;

first modulo generation means coupled to receive said bits in groups from said first register storage means and operative to generate intermediate check signals for said groups of said bit signals for application to a second one of said plurality of register storage means;

first shift control means coupled to different stages of said plurality of register storage means, said shift control means including means for receiving a first set of mode control signals; and, second buffer storage means coupled to receive bits of data characters in parallel read from said medium by said device for transfer to said bus, said buffer means including:

a plurality of storage register means coupled in series, each having a plurality of bistable stages, a first register means being coupled to receive bits of said data characters from said device and a second register being coupled to transfer bits of depacked data characters to said bus;

second modulo generating means coupled to receive said bits in groups from said first register storage means and operative to generate intermediate check signals for said groups of said bits for applying to said second register storage means; and, second shift control means coupled to different stages of said first and second register means and including means for receiving a second set of mode control signals;

said first shift control means being responsive to said first set of mode control signals during a write operation to condition different ones of said plurality of register means and said first generator means respectively to pack said bits of each of the data characters as received from said bus into characters arranged in one of a plurality of formats defined by said mode control signals for transfer a character at a time to said device and concurrently generate said intermediate check signals applied to said second one of said register for transfer through the remaining ones of said register means to verify that the transfer and packing of each character proceeded without error; and, said second shift control means being responsive to said second set of mode control signals during a read operation to condition different ones of said plurality of storage register means and said second generator means respectively to unpack the bits of the data characters as received in parallel from said device into one of said plurality of formats defined by said mode control signals and generate concurrently intermediate check signals applied to said second one of said storage register means to subsequent verify that the transfer and depacking of each character proceeded without error.

18. The system of claim 17 wherein said first generator means includes:

gating means connected to a first predetermined pair of stages of said first register means and operative to generate an intermediate check signal for each group of two bits of said data characters received by said first register means and wherein a predetermined one of the stages of second register means includes input gating means connected to said gating means, said input gating means in response to said intermediate check signals conditioning said predetermined register stage to complement state for producing a resulting check bit signal for the number of bits to be stored in said second register means.

19. The system according to claim 18 wherein said gating means of said first generator means includes exclusive or circuits connected to generate said intermediate signals for each pair of bits stored in said first predetermined pair of stages of said first register means.

20. The system of claim 18 wherein said second generator means includes:

first gating means connected to a first predetermined pair of stages of said first register means and operative to generate an intermediate checking signal for each group of two bits of said data characters received by said first register means and second gating means connected to a second different predetermined pair of stages of said first register means and operative to generate an intermediate checking signal for said each group of two bits of said data characters and wherein a predetermined stage of a second register means includes input gating means coupled to said logic control means and conditioned selectively to receive said intermediate checking signals from said first and second gating means, said input gating means in response to said intermediate checking signals conditioning said predetermined stage to complement state for producing a resulting check bit signal for the number of bits to be stored in said second register means.

21. The system according to claim 20 wherein said first and second gating means of said second generator means each includes exclusive or circuits connected to generate said intermediate checking signal for each pair of bits stored in said first and second predetermined pairs of stages of said first register means.

22. The system of claim 20 wherein said first predetermined pair and second predetermined pair of stages of said first register means correspond to the high order two data bit positions and the low order two bit positions respectively and wherein said first predetermined pair, said second predetermined pair and said predetermined stage of said second register correspond to the high order two data bit positions, the low order two bit positions and a check bit position respectively.

23. The system of claim 20 wherein said second shift control means includes:

shift register counter means for generating sets of sequence control signals, said register counter means including a plurality of stages connected in series and including means for receiving determined ones of said plurality of said second mode control signals for initially presetting certain ones of said stages to predetermined states; and, logic control means coupled to predetermined ones of said shift counter stages and coupled to receive said second set of mode control signals, said logic control means being conditioned by said mode control signals to enable the advancing of said shift counter means through different predetermined sequence of counts repetitively for generating said sets of control signals for depacking said bits of said data characters into a specified one of said plurality in said second register means.

24. The system of claim 23 wherein said first register means of said second buffer storage means includes;

first gating circuit means for connecting pairs of said plurality of stages to shift two bit positions at a time in a first predetermined direction and to recirculate end around the bits of data characters stored therein, second gating circuit means for connecting said pairs of said plurality of stages to shift in a second predetermined direction and recirculate the bit contents of said data characters stored therein two bits at a time, and wherein said second register means includes;

first gating means for connecting pairs of said plurality of stages of said second register means to shift two bit positions at a time in a predetermined direction the bits of data characters stored therein, and wherein said second buffer storage means further includes;

first transfer gating means connecting said first predetermined pair of stages of said first register means to a first predetermined pair of stages of said second register means for transfer of signal representations of pairs of bits of data characters stored in said first register means to said second register means as said bits are being shifted therethrough, and second transfer gating means connecting said different second predetermined pair of stages of said first register means to a second different predetermined pair of stages of said second register means for transfer of signal representations of said pairs of bits of said data characters stored in said first register means to said second register means as said bits are being shifted therethrough; and said logic control circuits of said second shift register control means being coupled to each of said gating circuit means of said first and second register means and said first and second transfer gating means, said logic control means being operative when said device reads tape in one direction to condition said first gating circuit means and a selected one of said transfer gating means by said sets of control signals for shifting in said first predetermined direction a predetermined number of times the bits of the packed data characters upon being received from said device and stored in said first register means concurrent with shifting in said first predetermined direction the bits transferred into said second register means and generating said intermediate checking signals so that upon termination of said shifting to have depacked in said second register means data characters arranged in said one format, each consisting of a second predetermined number of data and checking bits, and said logic control means being operative when said device reads tape in an opposite direction to condition said second gating circuit means and a selected one of said transfer gating means by said sets of control signals for shifting in said second predetermined direction a predetermined number of times the bits of said packed data characters upon being received from said device and stored in said first register means concurrent with shifting in said second predetermined direction the bits transferred into said second register means and generating said intermediate checking signals so that upon termination of said shifting to have depacked in said second register means data characters arranged in said one format, each consisting of a second predetermined number of data and checking bits.

25. The system of claim 23 wherein said second plurality of mode control signals are coded to condition said second shift register control means to operate to depack said bits of said packed data characters into characters arranged in a one by one character format wherein the bits of each data character transferred to said first register means are depacked into a single character in said second register means, a two by one character format wherein the bits of each character transferred to said first register means are depacked into two successive characters in said second register means or four by three character format wherein the bits of three data characters transferred in succession to said first register means are depacked into four successive characters in said second register means by shifting the bit contents of said first and second register means a predetermined number of times during a cycle of operation for a number of cycles of operation required for the format specified.

26. The system according to claim 17 wherein said first buffer storage means further includes character circuit checking means connected to said last one of said plurality of register storage means, said circuit checking means including means for generating check bit signals for all of the parallel data bits stored in said last one of said register storage means for comparison with the contents of a check bit position of said last register means for verifying that said transfer and packing operation had proceeded without error.

27. The system of claim 26 wherein said means of said circuit checking means includes an odd parity generator circuit.

28. The system according to claim 17 wherein said first shift control means includes:

shift counter means for generating sets of sequence control signals, said shift counter means having a plurality of storage stages connected serially and including means for receiving predetermined ones of said first set of mode control signals for initially presetting certain ones of said stages to predetermined states; and, logic control circuits coupled to predetermined ones of said shift counter stages, and coupled to receive said plurality of mode control signals, said logic control circuits being conditioned by said mode control signals to enable the advancing of said shift counter means through a predetermined sequence of counts repetitively for generating said sets of control signals for packing said bits of said data characters into a specified format in said second register means.

29. The system according to claim 28 wherein said first plurality of mode control signals are coded to condition said first shift register control means to pack said bits of said data characters into characters arranged in an one by one character format wherein the bits of each data character transferred to said first register means are packed into a single character in said second register means, a two by one character format wherein the bits of two data characters transferred in succession to said first register means are packed into a single character in said second register means, or four by three character format wherein the bits of four data characters transferred in succession to said first register means are packed into three successive characters in said second register means by shifting the bit contents of said first and second register means a predetermined number of times during a cycle of operation for a number of cycles of operation required for the formats specified.

30. The system of claim 29 wherein said first predetermined pair of stages corresponds to the low order two bit positions of said first register means and wherein said first predetermined pair of stages and said predetermined stage of said second register means correspond to the high order two bit positions and a parity check bit position respectively.

31. The system of claim 28 wherein said first register means of said first buffer storage means includes;

first gating circuit means for connecting different pairs of said plurality of stages to shift two bit positions at a time in a predetermined direction and to recirculate end around the bits of data characters stored therein and wherein said second register means includes;

first gating means for connecting different pairs of said plurality of stages of said second register means to shift two bit positions at a time in a predetermined direction the bits of data characters stored therein and wherein said first buffer storage means further includes;

first transfer gating means connecting said predetermined pair of stages of said first register means to a first predetermined pair of stages of said second register means for transfer of signal representations of pairs of bits of characters stored in said first register means to said second register means as said bits are being shifted therethrough;

and said logic control circuits of said first shift register control means being coupled to each of said first gating means of said first and second register means, said logic control means being operative to condition each said first gating means and said first transfer gating means by said sets of control signals for shifting a predetermined number of times said bits of said data characters upon being received and stored in said first register means concurrent with shifting the bits transferred to said second register means and generating said intermediate checking signals so that upon termination of said shifting to have packed in said second register means data characters arranged in said one format, each consisting of a first predetermined number of data and check bits.

32. The system of claim 28 wherein said first buffer storage means further includes second transfer gating means connected to said logic control circuits and to a second predetermined pair of stages of said second register means for transfer of signal representations of pairs of bits of characters stored in said first register means to said second register means when conditioned by said second sets of signals for packing said bits of said data characters into characters arranged in a predetermined format.

33. The system of claim 32 wherein said predetermined format is a two by one character format in which the bits of two data characters transferred in succession to said first register means are packed into a single data character in said second register means.

* * * * *

UNITED STATES PATENT OFFICE

CERTIFICATE OF CORRECTION

Patent No. 3,863,217 Dated January 28, 1975

Inventor(s) Donald R. Taylor

It is certified that error appears in the above-identified patent and that said Letters Patent are hereby corrected as shown below:

Column 30, line 36, delete "logic" and insert --second--.

Signed and sealed this 6th day of May 1975.

(SEAL)
Attest:

RUTH C. MASON
Attesting Officer

C. MARSHALL DANN
Commissioner of Patents
and Trademarks

IRM PO-1050 (10-69)

USCOMM-DC 60376-P69
★ U.S. GOVERNMENT PRINTING OFFICE : 1969 O—366-334.